(12) United States Patent
Bando et al.

(10) Patent No.: US 7,355,604 B2
(45) Date of Patent: Apr. 8, 2008

(54) IMAGE RENDERING METHOD AND IMAGE RENDERING APPARATUS USING ANISOTROPIC TEXTURE MAPPING

(75) Inventors: Yosuke Bando, Fuchu (JP); Takahiro Saito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 165 days.

(21) Appl. No.: 11/400,420

(22) Filed: Apr. 7, 2006

(65) Prior Publication Data

US 2006/0250409 A1 Nov. 9, 2006

(30) Foreign Application Priority Data

Apr. 8, 2005 (JP) .............................. 2005-112418

(51) Int. Cl.
- G09G 5/00 (2006.01)
- G06K 9/40 (2006.01)
- G06T 15/60 (2006.01)
- G06T 17/00 (2006.01)

(52) U.S. Cl. ...................... 345/582; 345/428; 345/587; 345/586; 345/545; 382/285; 382/296

(58) Field of Classification Search ........ 345/418–423, 345/428, 581–583, 587, 606–610, 613–618, 345/545, 552, 657; 382/218, 265, 285–286, 382/296

See application file for complete search history.

(56) References Cited

U.S. PATENT DOCUMENTS 6,097,397 A * 8/2000 Lee .............................. 345/586
6,219,064 B1 4/2001 Kamen et al.
6,400,370 B1 6/2002 Lee et al.
6,664,971 B1 12/2003 Mukherjee et al.
6,724,395 B1 4/2004 Treichler
6,816,167 B1 * 11/2004 Rauchfuss et al. .......... 345/582
7,271,810 B1 * 9/2007 Newhall et al. ............. 345/582
2005/0219256 A1 * 10/2005 Donovan et al. ........... 345/586

OTHER PUBLICATIONS

Barkans, A., "High Quality Rendering Using the Talisman Architecture", Proceedings of the 1997 SIGGRAPH/Eurographics Workshop on Graphics Hardware, pp. 79-88, 1997.

GL_EXT_texture_filter_anisotropic, OpenGL Extension Registry, Silicon Graphics, Inc., http://css.sgi.com/projects/ogl-sample/registry/EXT/texture-filter-anisotropic.txt, Apr. 25, 2000.

Heckbert, Paul, "Fundamentals of Texture Mapping and Image Warping", Master's Thesis, Dept. of Electrical Engineering and Computer Science, University of California, Berkeley, Jun. 17, 1989.

McCormak, J., et al., "Feline: Fast Elliptical Lines for Anisotropic Texture Mapping", Proceedings of SIGGRAPH '99, pp. 243-250, 1999.

* cited by examiner

Primary Examiner—Wesner Sajous
(74) Attorney, Agent, or Firm—Sprinkle IP Law Group

(57) ABSTRACT

An image rendering method includes generating pixels in accordance with graphic information, determining a direction of anisotropy of a footprint obtained by projecting the pixel on a texture on which a set of texels are disposed on uv-coordinates, and executing sampling of a MIP map in accordance with the direction of anisotropy, and executing texture mapping for the pixel. The direction of anisotropy is determined by comparing lengths in at least three different directions of the footprint on the texture.

13 Claims, 23 Drawing Sheets

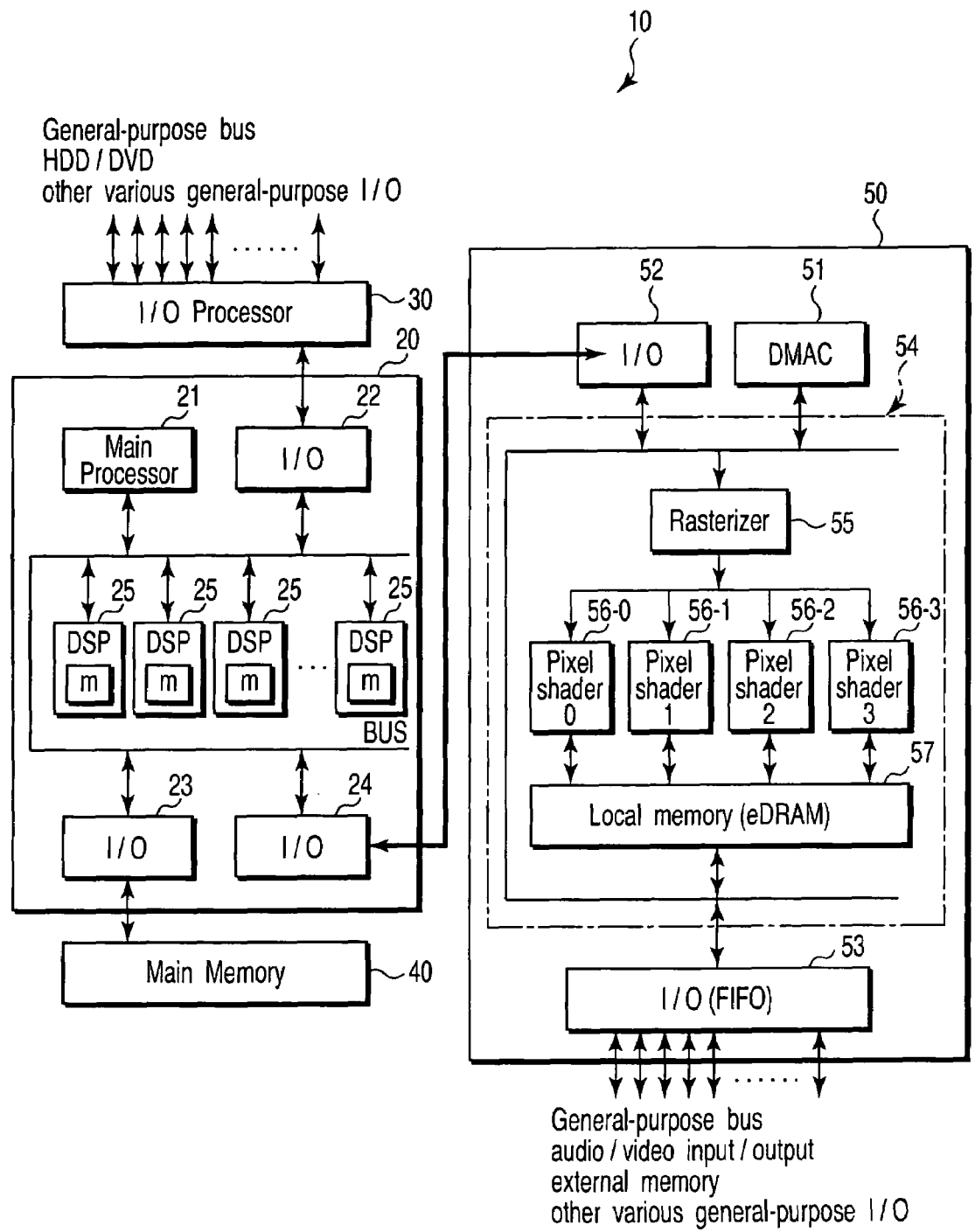
F I G. 1

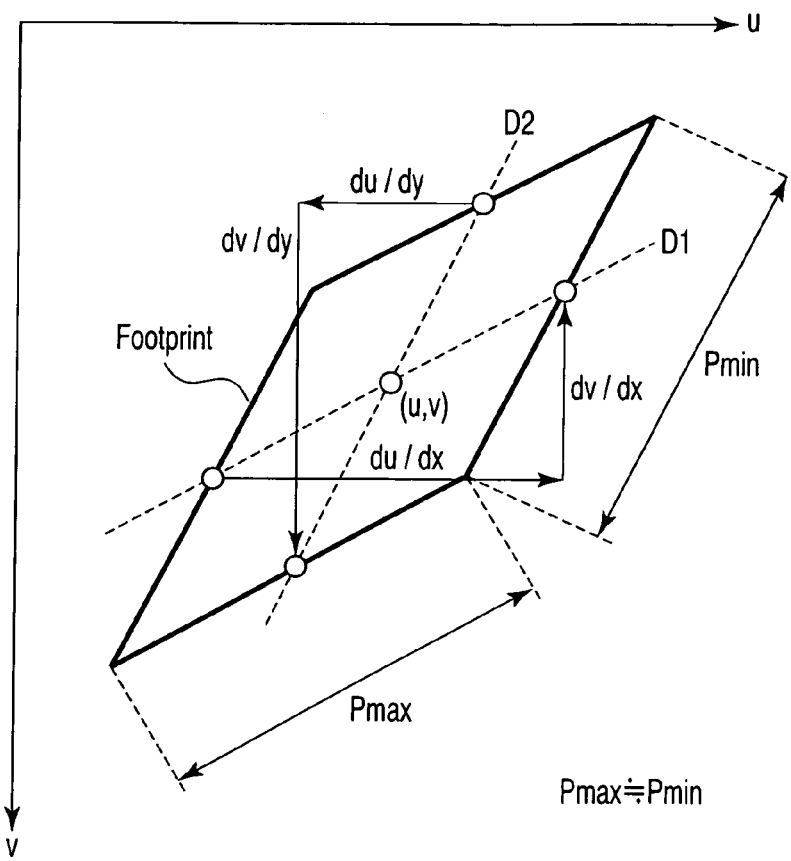
F I G. 17
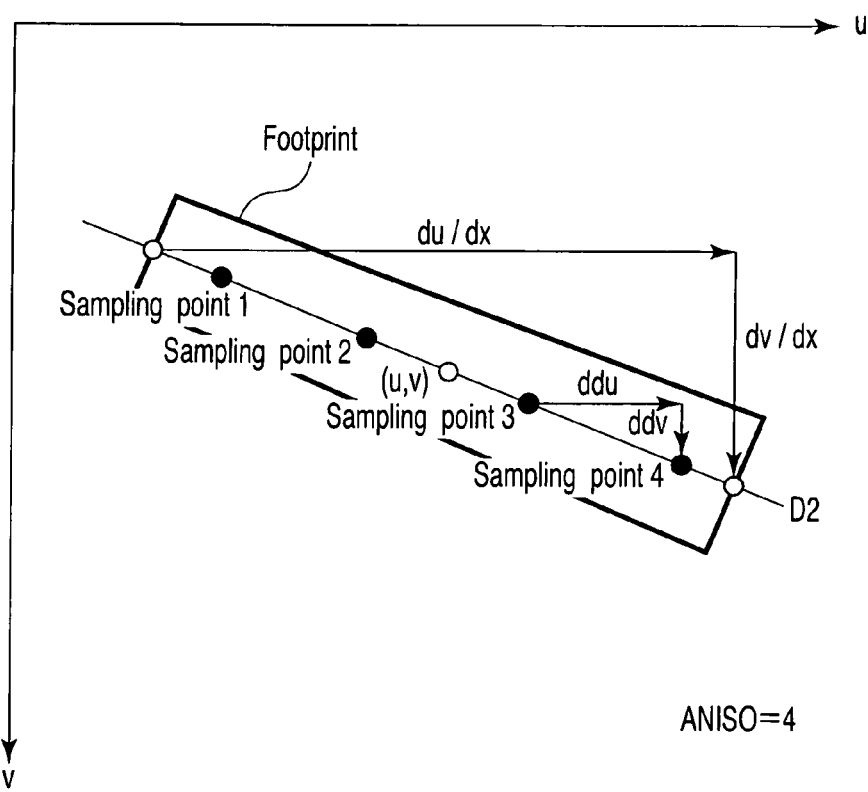
F I G. 18

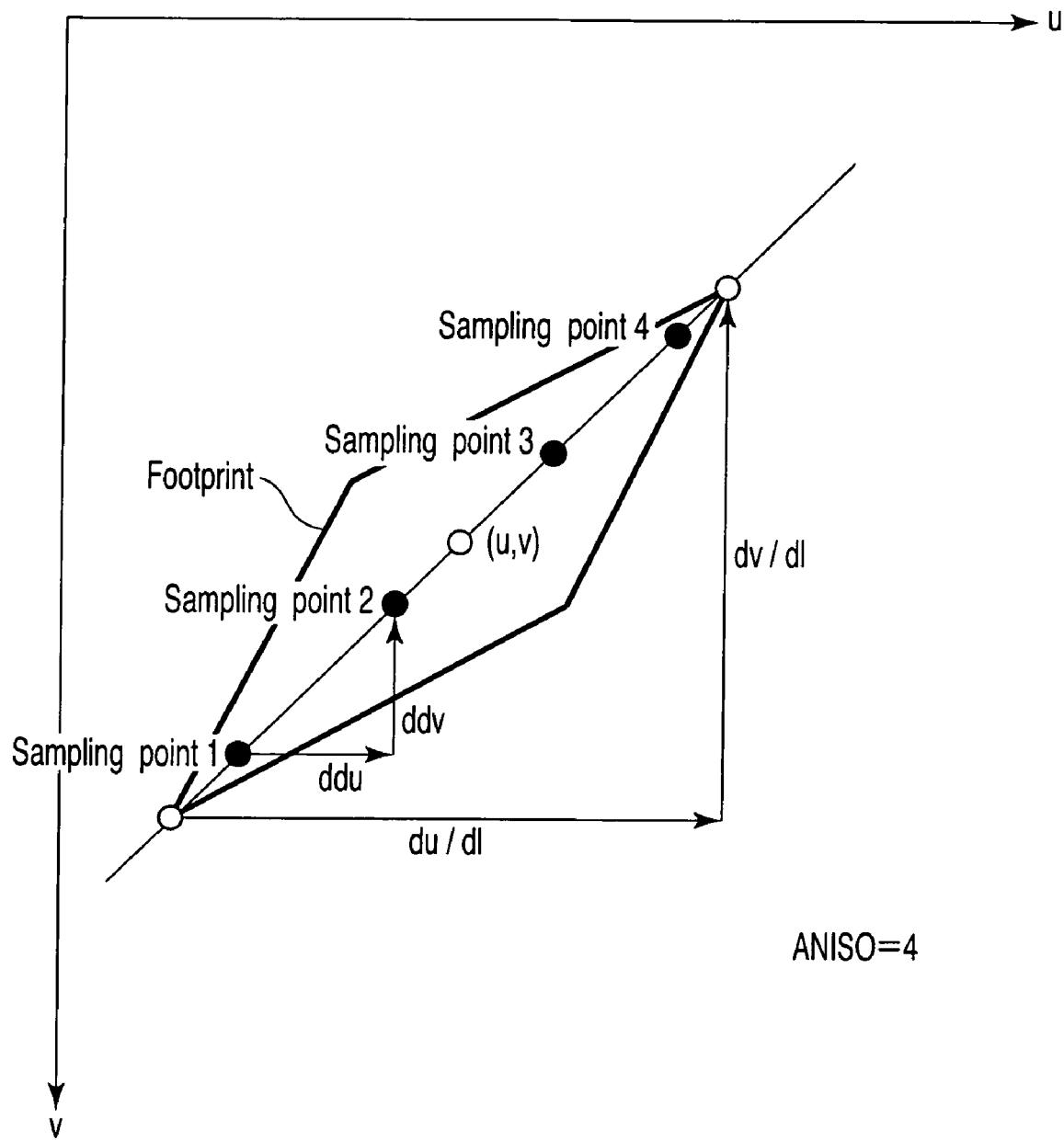
F I G. 19

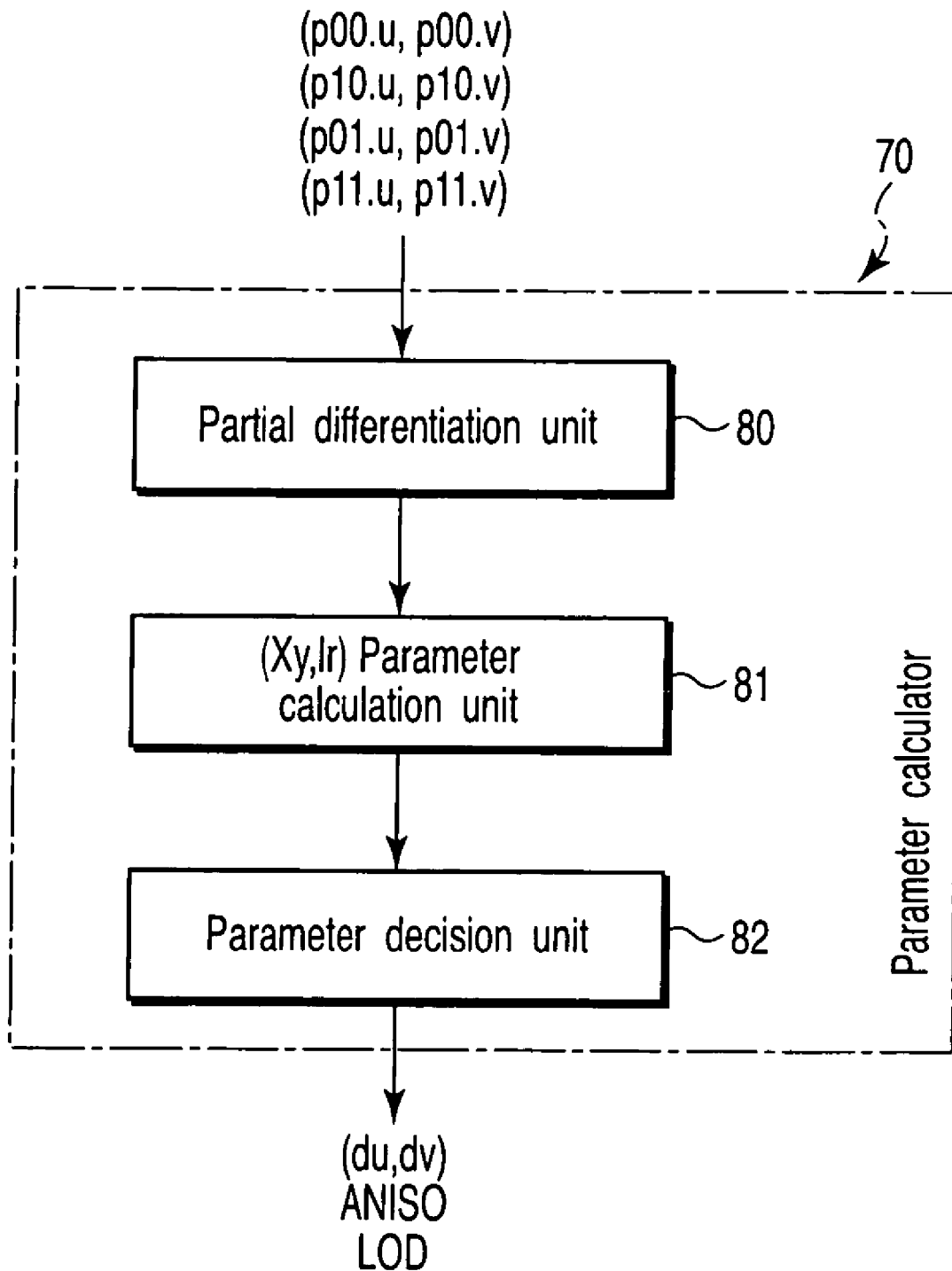
F I G. 20

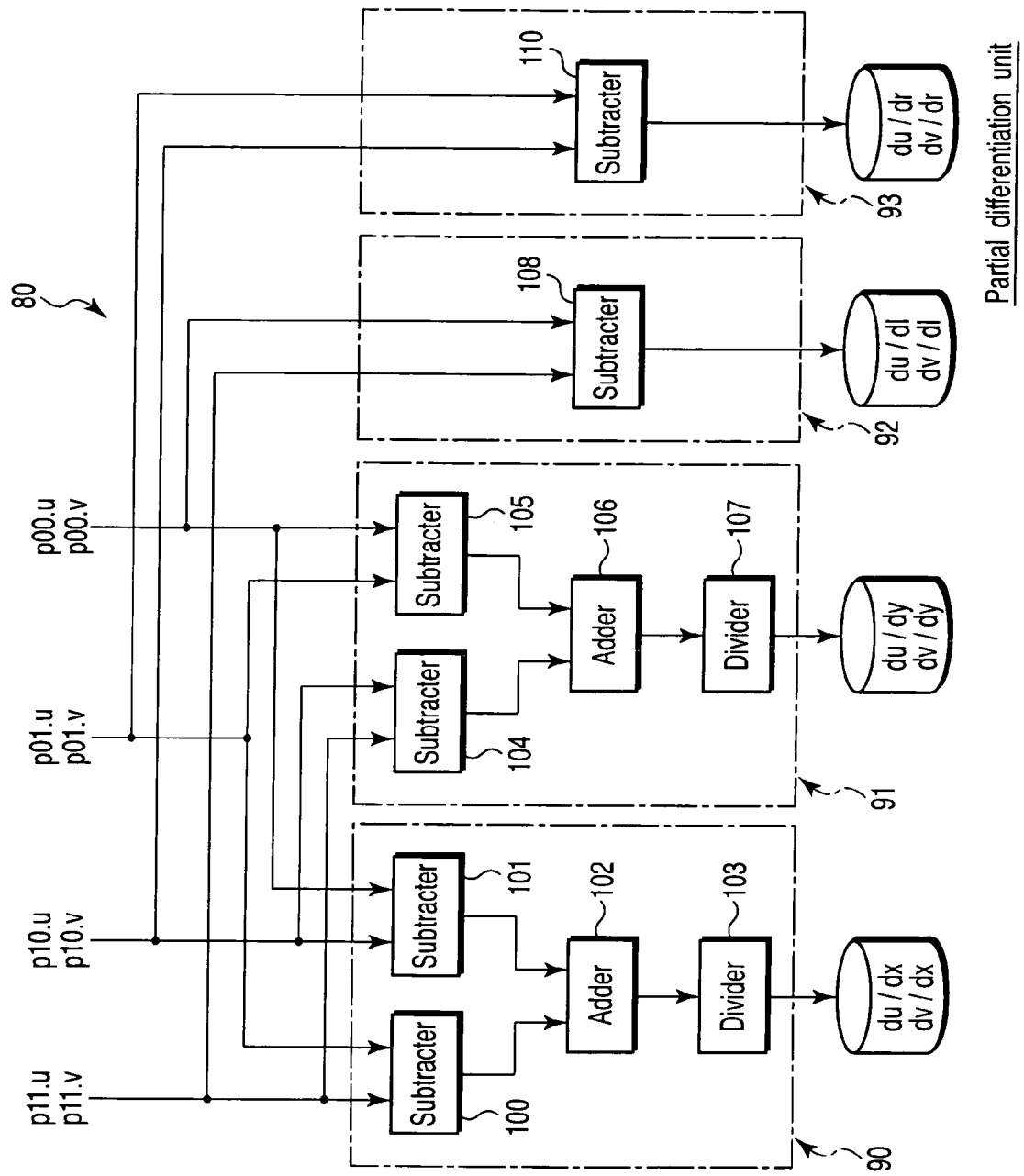
F I G. 24

FIG. 26  Parameter decision unit

IMAGE RENDERING METHOD AND IMAGE RENDERING APPARATUS USING ANISOTROPIC TEXTURE MAPPING

CROSS-REFERENCE TO RELATED APPLICATIONS

This application is based upon and claims the benefit of priority from prior Japanese Patent Application No. 2005-112418, filed Apr. 8, 2005, the entire contents of which are incorporated herein by reference.

BACKGROUND OF THE INVENTION

1. Field of the Invention

The present invention relates generally to an image rendering method and an image rendering apparatus. The invention relates to, for example, anisotropic texture mapping.

2. Description of the Related Art

In recent years, the performance of image rendering apparatus has remarkably been enhanced.

Digital image data is represented by a set of pixels. When a pixel process is executed, an image (texture) that represents a picture/pattern or material properties of a surface of an object is added. Thereby, a more detailed representation is realized. This process is called "texture mapping". The position of each pixel on the texture can be understood from an image (pixel footprint) that is obtained by projecting the pixel back onto the texture. In some cases, the footprint is distorted with anisotropy on the texture. In such cases, the direction of anisotropy is estimated, and the texture is reconstructed with some filtering, as disclosed, for instance, in Paul S. Heckbert, "Fundamentals of Texture Mapping and Image Warping (Masters Thesis)", Report No. UCB/CSD 89/516, Computer Science Division, University of California, Berkeley, June 1989.

In this method, however, a normal distribution (Gaussian) which centers at a pixel is considered on a frame buffer. The normal distribution is projected back onto the texture, and an elliptically distorted filter (elliptical weighted average) is applied. Consequently, an enormous amount of calculation is required, and the cost for calculation is high. This is not suited to hardware implementation.

Another method is disclosed in the home page of Open GL Extension (oss.sgi.com/projects/ogl-sample/registry/EXT/texture_filter_anisotropic.txt). In this method, the cost for calculation can be reduced by using a MIP mapping circuit multiple times. However, as the shape of the footprint of a pixel becomes less similar to a rectangle, the calculation of anisotropy tends to become more difficult. As a result, the image blurs and the precision of image rendering deteriorates.

BRIEF SUMMARY OF THE INVENTION

An image rendering method according to an aspect of the present invention includes:

generating pixels in accordance with graphic information;

determining a direction of anisotropy of a footprint obtained by projecting the pixel on a texture on which a set of texels are disposed on uv-coordinates, the direction of anisotropy being determined by comparing lengths in at least three different directions of the footprint on the texture; and executing sampling of a MIP map in accordance with the direction of anisotropy, and executing texture mapping for the pixel.

An image processing apparatus according to an aspect of the present invention includes:

a rasterizer which generates pixels corresponding to a graphic to be rendered, which are included in a plurality of pixels obtained by dividing a graphic drawing region in a matrix;

a plurality of pixel processing sections which execute rendering processes for the pixels generated by the rasterizer, thereby forming a frame buffer on which a set of the pixels are disposed on xy-coordinates;

a texture unit which executes a process for adding a texture, on which a set of texels are disposed on uv-coordinates, to the pixel; and a plurality of memories which store data of the pixels rendered by the pixel processing sections and the texture unit, the texture unit including:

a differentiation circuit which calculates differential coefficients of the texture coordinates with respect to at least three directions on the frame buffer;

a differential vector calculation circuit which calculates differential vectors in the at least three directions of the texture coordinates on the basis of the calculation result of the differentiation circuit; and a selection circuit which selects, based on the result of the differential vector calculation circuit, one of the at least three directions in which the magnitude of the differential vector is the greatest as an axis of anisotropy of the pixel shape on the texture coordinates.

BRIEF DESCRIPTION OF THE SEVERAL VIEWS OF THE DRAWING

FIG. 1 is a block diagram that shows an image processing apparatus according to a first embodiment of the present invention;

FIG. 17 is a schematic view showing a footprint on a texture in the image process method according to the first embodiment of the invention;

FIG. 18 is a schematic view showing a footprint on a texture in an image process method according to a second embodiment of the invention;

FIG. 19 is a schematic view showing a footprint on a texture in the image process method according to the second embodiment of the invention;

FIG. 20 is a block diagram that shows a parameter calculator that is included in a texture unit according to a third embodiment of the invention;

FIG. 24 is a block diagram that shows a partial differentiation unit that is included in the texture unit according to a fourth embodiment of the invention;

DETAILED DESCRIPTION OF THE INVENTION

Figure 2:
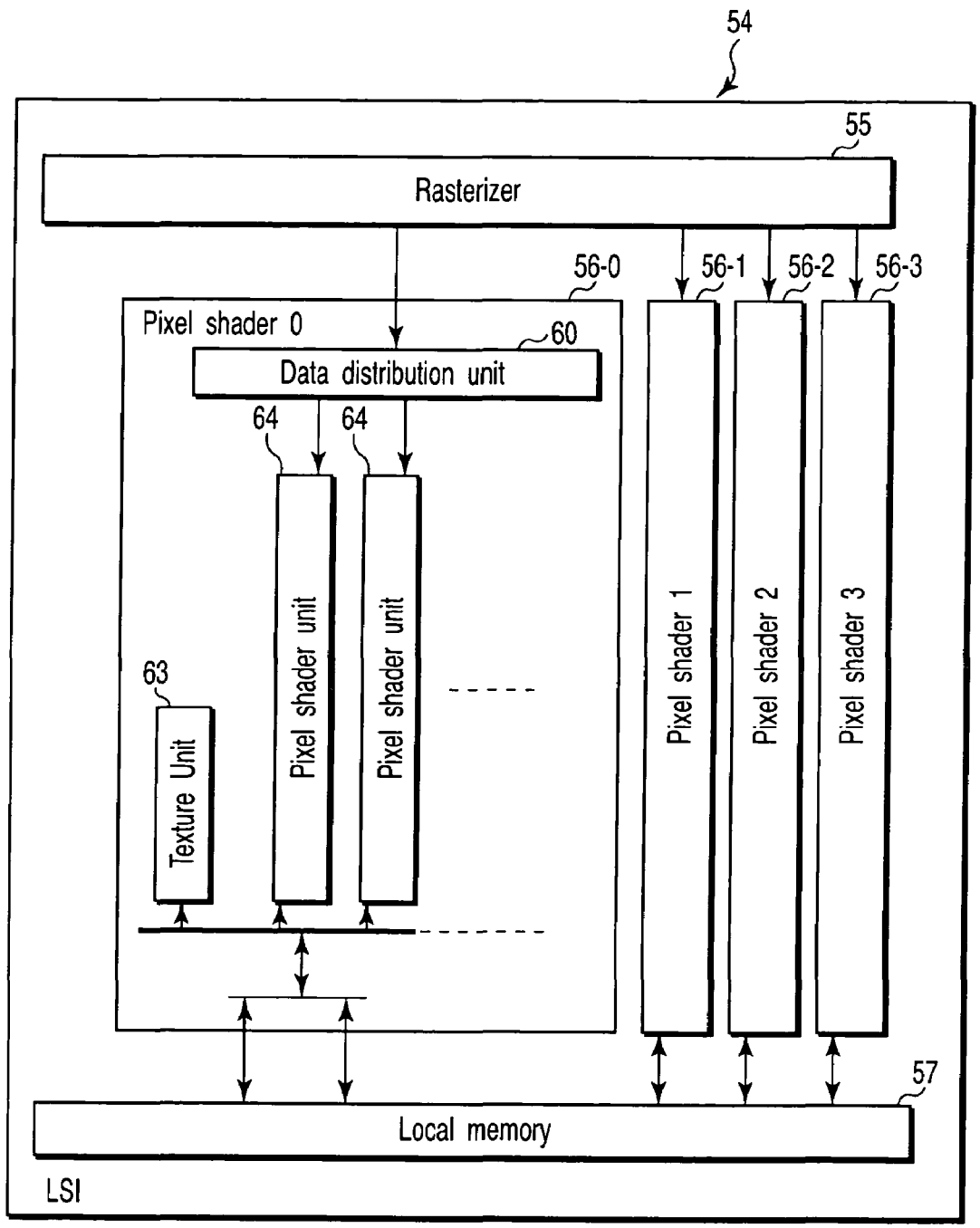
FIG. 2 is a block diagram that shows an arithmetic process section that is included in a graphic processor according to the first embodiment of the invention.

An image rendering method and an image rendering apparatus according to a first embodiment of the present invention will now be described with reference to FIG. 1. FIG. 1 is a block diagram that shows an image rendering processor system LSI 10 according to this embodiment.

As is shown in FIG. 1, the image rendering processor system LSI 10 according to the first embodiment includes a host processor 20, an I/O processor 30, a main memory 40 and a graphic processor 50. The host processor 20 and graphic processor 50 are connected over a processor bus BUS so as to be mutually communicable.

The host processor 20 includes a main processor 21, I/O sections 22 to 24, and a plurality of digital signal processors (DSPs) 25. These circuit blocks are connected over a local network LN1 so as to be mutually communicable. The main processor 21 controls the operations of the respective circuit blocks in the host processor 20. The I/O section 22 executes data transmission/reception via the I/O processor 30 between the host processor 20 and the outside. The I/O section 23 executes data transmission/reception with the main memory 40. The I/O section 24 executes data transmission/reception with the graphic processor 50 via the processor bus BUS. The digital signal processors 25 execute signal processing on the basis of data that is read out of the main memory 40 or from the outside.

The I/O processor 30 connects the host processor 20 to, for instance, a general-purpose bus, a peripheral such as an HDD or a DVD (Digital Versatile Disc) drive, and a network. In this case, the HDD or DVD drive may be embedded in the LSI 10 or may be provided outside the LSI 10.

The main memory 40 stores programs that are necessary for the operation of the host processor 20. The programs are read out, for example, from an HDD (not shown) and are loaded in the main memory 40.

The graphic processor 50 includes a DMA (Direct Memory Access) controller 51, I/O sections 52 and 53, and an arithmetic process section 54. The DMA controller 51 controls communication between the host processor 20 and the graphic processor 50 and communication within the arithmetic process section 54. The I/O section 52 controls input/output from/to the host processor 20 via the processor bus BUS. The I/O section 53 controls, for example, input/output from/to various general-purpose buses such as a PCI bus, audio/video input/output, and input/output from/to an external memory. The arithmetic process section 54 executes image processing arithmetic operations.

The arithmetic process section 54 includes a rasterizer 55, a plurality of pixel shaders 56-0 to 56-3, and a local memory 57. In this embodiment, the number of pixel shaders is four. However, the number of pixel shaders is not limited to four, and may be 8, 16, 32, etc. Referring now to FIG. 2, the structure of the arithmetic process section 54 is described. FIG. 2 is a block diagram of the arithmetic process section 54.

The rasterizer 55 generates pixels in accordance with input graphic information. A pixel is the minimum-unit region that is handled when a given graphic is to be rendered. A graphic is rendered by a set of pixels.

The pixel shaders 56-0 to 56-3 execute arithmetic operations based on pixels that are input from the rasterizer 55, and generate image data in frame buffers on local memory (to be described later). Each of the pixel shaders 56-0 to 56-3 includes an data distribution unit 60, a texture unit 63, and a plurality of pixel shader units 64.

The data distribution unit 60 receives pixel data from the rasterizer 55, and distributes the received pixel data to the pixel shader units 64-0 to 64-3.

The texture unit 63 executes a texture process, and adds texture data to the pixel that is processed by the pixel shader units 64("texture mapping").

The pixel shader units 64 constitute a shader engine and execute a image rendering program for pixel data. The individual pixel shader units 64 perform SIMD (Single Instruction Multiple Data) operations and execute rendering processes for four pixels at the same time.

The local memory 57 is for instance, eDRAMs (embedded DRAMs). The local memory 57 stores pixel data that are rendered by the pixel shaders 56-0 to 56-3. The local memory includes a plurality of memory units in association with each of the pixel shader units 64.

Figure 3:
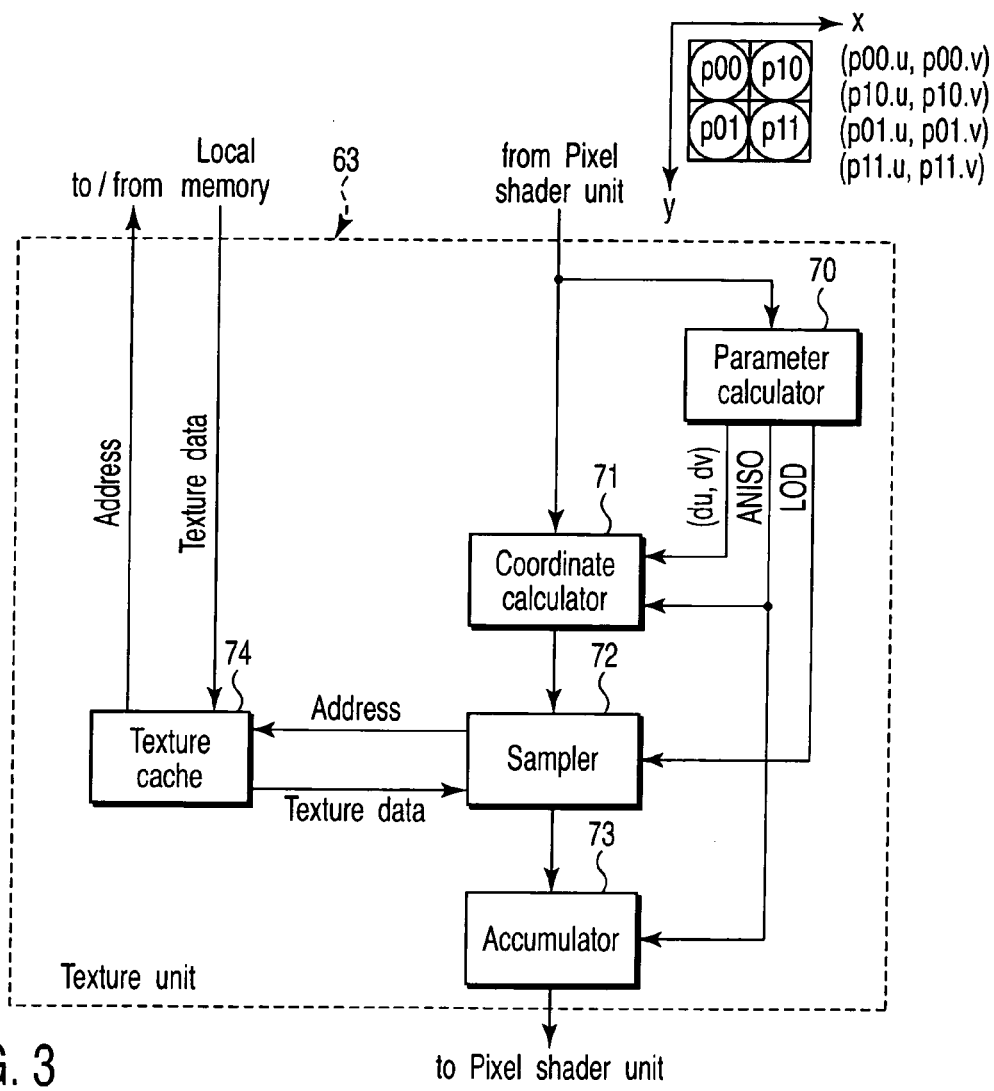
FIG. 3 is a block diagram that shows a texture unit that is included in the arithmetic process section according to the first embodiment of the invention.

Next, the structure of the texture unit 63 that is included in each pixel shader 56-0 to 56-3 is described with reference to FIG. 3. FIG. 3 is a block diagram that shows a part of the texture unit 63. As is shown in FIG. 3, the texture unit 63 includes a parameter calculator 70, a coordinate calculator 71, a sampler 72, an accumulator 73, and a texture cache memory 74.

FIG. 3 shows the part that executes anisotropic texture mapping in the texture unit 63. The anisotropic texture mapping is described below.

The rasterizer 55 determines a set of pixels that are covered by a graphic that is to be rendered, and interpolates parameter values from vertex coordinates of the graphic. With respect to each pixel, a color and other attributes are calculated on the basis of the parameters, and the calculation results are stored in a frame buffer. The frame buffer is a two-dimensional pixel array. Pixel coordinates are hereinafter expressed by (x, y).

When a pixel process is executed, an image (texture) that represents a picture/pattern or material properties of a surface of an object is mapped. Thereby, a more detailed representation is realized. This process is called texture mapping. The texture is a two-dimensional array of texels. Hereinafter, the coordinates of texels are expressed by (u, v). Basically, texel coordinates are given to each vertex of a graphic as one of parameters. An image (pixel footprint) that is obtained by projecting each pixel, which lies on the frame buffer with the coordinates interpolated by the rasterizer 55, onto the texture greatly varies depending on the manner of giving texel coordinates to the object and the projection conversion. Thus, when the texture mapping is to be executed, it is necessary to apply some filtering to the texels within the foot print.

Figure 4:
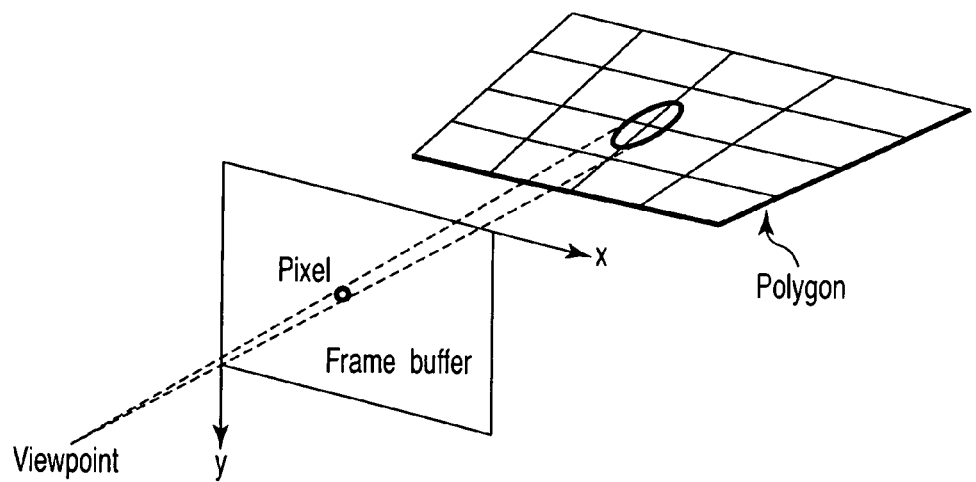
FIG. 4 is a diagram that shows the relationship between a frame buffer and a polygon in an image processing method according to the first embodiment of the invention.
Figure 5:
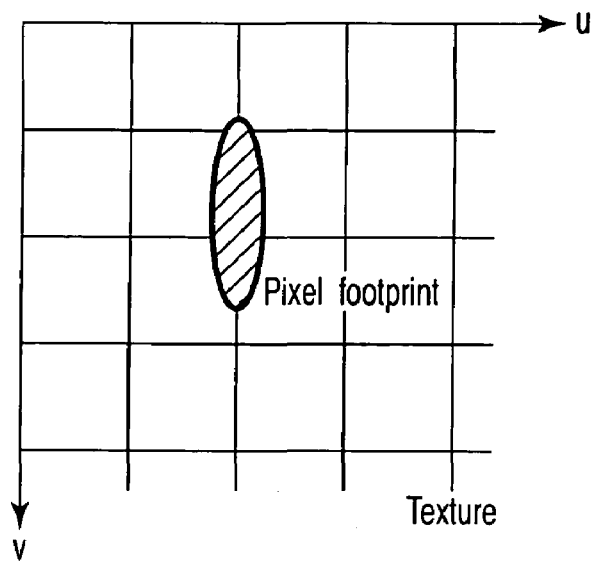
FIG. 5 is a schematic view of a texture in the image processing method according to the first embodiment of the invention.

FIG. 4 and FIG. 5 show the scheme of this process. FIG. 4 is a conceptual view that illustrates a polygon corresponding to the frame buffer. Assume that a circular pixel is present on the frame buffer, as is shown in FIG. 4. Assume also that the polygon corresponding to the pixel is greatly inclined with respect to the line of sight. Then, as shown in FIG. 5, the footprint takes a shape that is greatly elongated in a certain direction. This direction is called "direction of anisotropy". Thus, in this case, the texels are not added to the pixel as they are, and they are subjected to some filtering.

The methods of filtering used in the texture unit 63 are bilinear filtering and MIP mapping. In the bilinear filtering, four neighboring texels of a given pixel's texture coordinate are acquired and linear interpolation is executed using the four texels. This filtering process is executed by the sampler 72.

In the MIP mapping, a plurality of pre-filtered images (MIP maps) with different resolutions are prepared in a memory. An image with a proper resolution is selected in accordance with the size of a footprint. If the number of MIP maps is N, (0–(N–1)) is referred to as "MIP map level". If the MIP map level increases by 1, the size of the image is halved both in width and height. The MIP map level is selected by a value LOD that represents a level-of-detail of texture. The value LOD is calculated by the parameter calculator 70.

In a case where the footprint is elongated in a given direction, that is, in a case where the footprint has anisotropy, the sampler 72 executes sampling of MIP maps more than once in accordance with the direction of anisotropy. A value ANISO that represents the number of sampling points and a direction (du, dv) of sampling are calculated by the parameter calculator 70. In addition, the coordinate calculator 71 calculates texture coordinates of sampling points on the basis of the (du, dv) and ANISO.

The accumulator 73 accumulates sampling results of MIP maps at plural points, and outputs, as a final result, a mean value that is obtained by dividing the accumulated value by ANISO. The texture cache memory 74 stores texture data that is read out of local memory 57. The sampler 72 calculates a memory address of necessary texture data, and issues a texture data readout request to the texture cache memory 74. If necessary data is not stored in the texture cache memory 74, the texture cache memory 74 is instructed to read out the data from the local memory.

Figure 6:
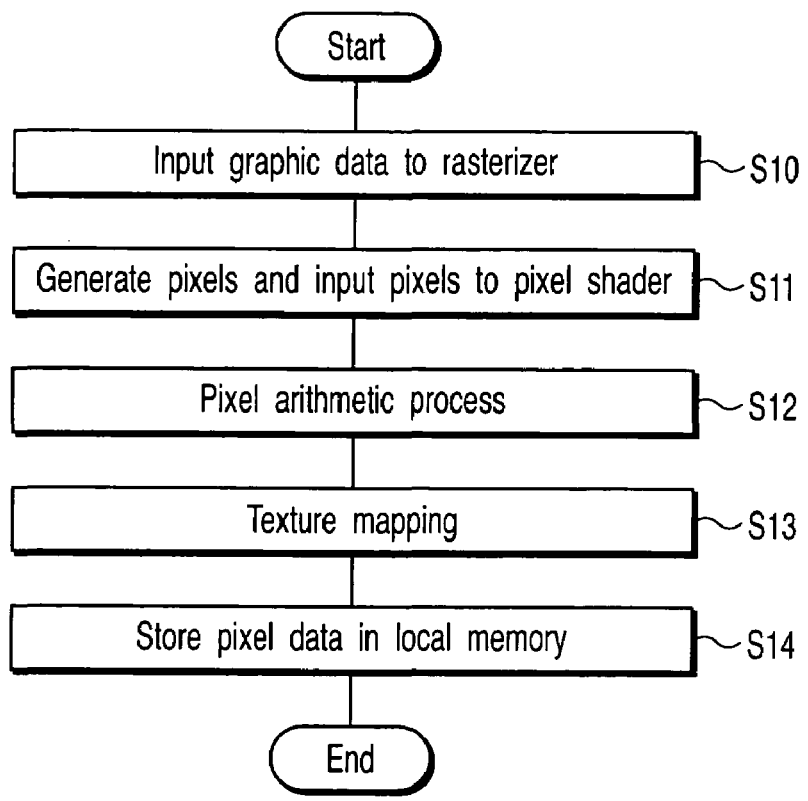
FIG. 6 is a flow chart illustrating an image process method according to the first embodiment of the invention.

Next, the operation of the graphic processor 50 with the above-described structure is described, paying particular attention to the anisotropic texture mapping. FIG. 6 is a flow chart illustrating a graphic rendering process that is executed by the graphic processor 50.

When a graphic is to be rendered, graphic information is first input to the rasterizer 55 (step S10). The graphic information includes, for instance, vertex coordinates of a graphic and color information. Then, the rasterizer 55 generates pixels corresponding to positions that are occupied by the graphic to be rendered, and delivers the generated pixels to the data distribution unit 60 of any one of the pixel shaders 56-0 to 56-3 (step S11). The data distribution unit 60 distributes the pixels to the pixel shader units 64 in units of four. The pixel shader units 64 execute the image rendering program, and perform a pixel-rendering process (step S12). Subsequently, the pixels are sent from the pixel shader units 64 to the texture unit 63, and the texture unit 63 executes texture mapping (step S13). If the texture mapping is completed, the pixel is stored in the local memory 57, and the process ends (step S14).

The result of the texture mapping is once returned to any one of the pixel shader units 64, and then stored in the local memory. At an arbitrary time instant in the pixel processing, the pixel shader unit 64, issues a texture request and is able to execute other instructions until the result is returned from the texture unit 63. The pixel shader unit 64 may further execute the pixel processing using the result returned from the texture unit 63, or may issue a further texture request, or may store the result in the local memory. Since the pixel shader units 64 operate according to instructions written by programmers, the above-mentioned degree of freedom is provided. In this sense, in FIG. 6, the texture mapping (step S13) may be considered as a part of the pixel arithmetic process (step S12).

Figure 7:
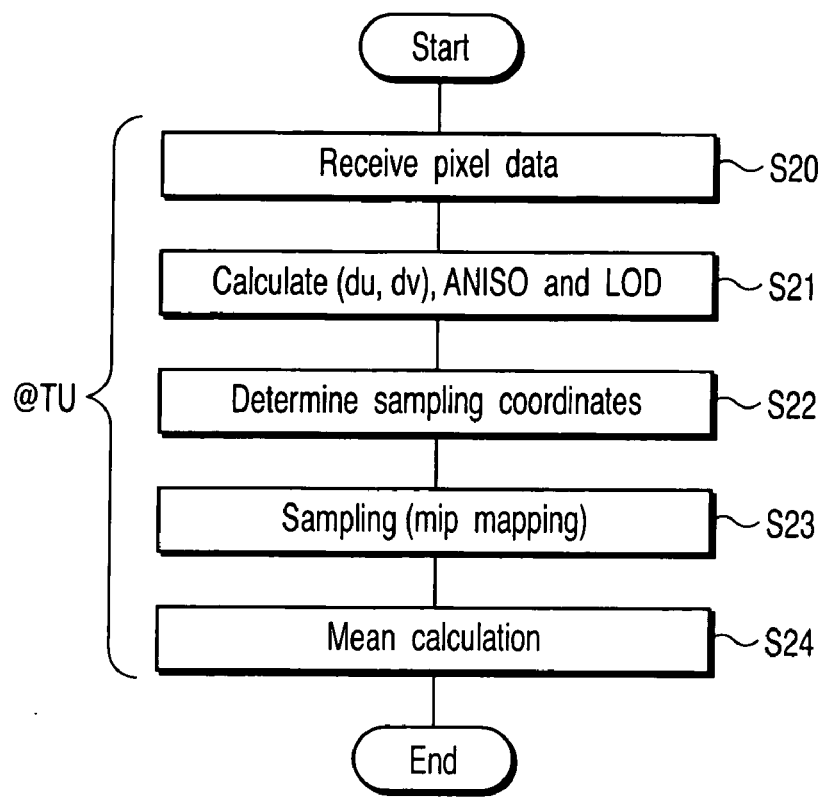
FIG. 7 is a flow chart illustrating an image process method according to the first embodiment of the invention.

Next, the details of the texture mapping in step S13 are described referring to FIG. 3 and FIG. 7. FIG. 7 is a flow chart of the texture mapping.

To start with, pixel data is input from any one of the pixel shader units 64 to the texture unit 63 (step S20). In FIG. 3, data of (2×2) pixels p00, p01, p10 and p11 are input. The uv-coordinate values of the four pixels are expressed as follows:

p00: (p00.u, p00.v)
p01: (p01.u, p01.v)
p10: (p10.u, p10.v)
p11: (p11.u, p11.v).

Figure 8:
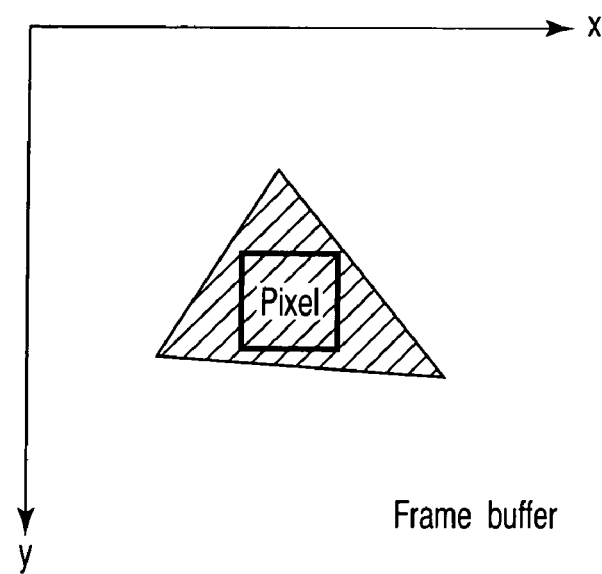
FIG. 8 is a schematic view of a frame buffer in the image process method according to the first embodiment of the invention.
Figure 9:
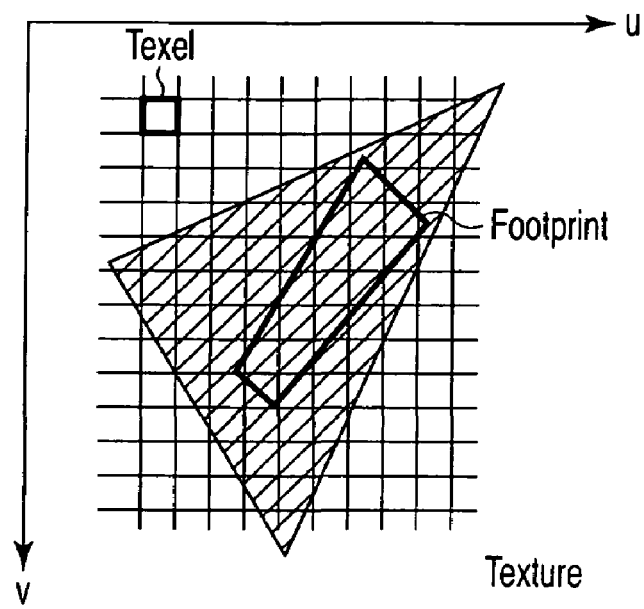
FIG. 9 is a schematic view of a texture in the image process method according to the first embodiment of the invention.

FIG. 8 and FIG. 9 show an example of the shape of one pixel on xy-coordinates, and an example of the shape of a footprint on uv-coordinates.

Subsequently, the parameter calculator 70 calculates ANISO, LOD and (du, dv) on the basis of the above coordinates (step S21). The process in step S21 is described in detail with reference to a flow chart of FIG. 10.

The parameter calculator 70 first finds partial differential coefficients du/dx, du/dy, dv/dx, and dv/dy of texture coordinates in a 0° direction (x-axis) and a 90° direction (y-axis) on the frame buffer (step S30). The partial differential coefficients are obtained by the following equations (2):

$$du/dx=((p10.u-p00.u)+(p11.u-p01.u))/2$$

$$du/dy=((p10.v-p00.v)+(p11.v-p01.v))/2$$

$$dv/dx=((p01.u-p00.u)+(p11.u-p10.u))/2$$

$$dv/dy=((p01.v-p00.v)+(p11.v-p10.v))/2 \qquad (2)$$

Figure 11:
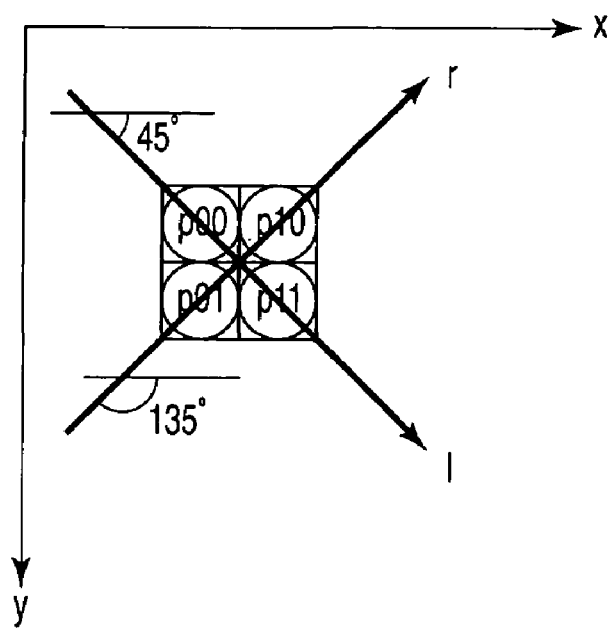
FIG. 11 is a schematic view of a frame buffer in the image process method according to the first embodiment of the invention.

Further, the parameter calculator 70 finds partial differential coefficients du/dr, du/dl, dv/dr, and dv/dl of texture coordinates in a 45° direction (l-axis) and a 135° direction (r-axis) relative to the x-axis, as shown in FIG. 11 (step S31). These partial differential coefficients are obtained by the following equations (3):

$$du/dl=(p11.u-p00.u)/\sqrt{2}$$

$$dv/dl=(p11.v-p00.v)/\sqrt{2}$$

$$du/dr=(p10.u-p01.u)/\sqrt{2}$$

$$dv/dr=(p10.v-p01.v)/\sqrt{2} \qquad (3)$$

The division by $\sqrt{2}$ is performed in order to cancel the length of the diagonal of the pixel.

Then, ANISO and LOD are calculated. The calculation of ANISO and LOD are performed with respect to not only the x-axis and y-axis but also the l-axis and r-axis. Hereinafter, the ANISO and LOD for the x-axis and y-axis are referred to as ANISOxy and LODxy, and the ANISO and LOD for the l-axis and r-axis are referred to as ANISOlr and LODlr.

Figure 12:
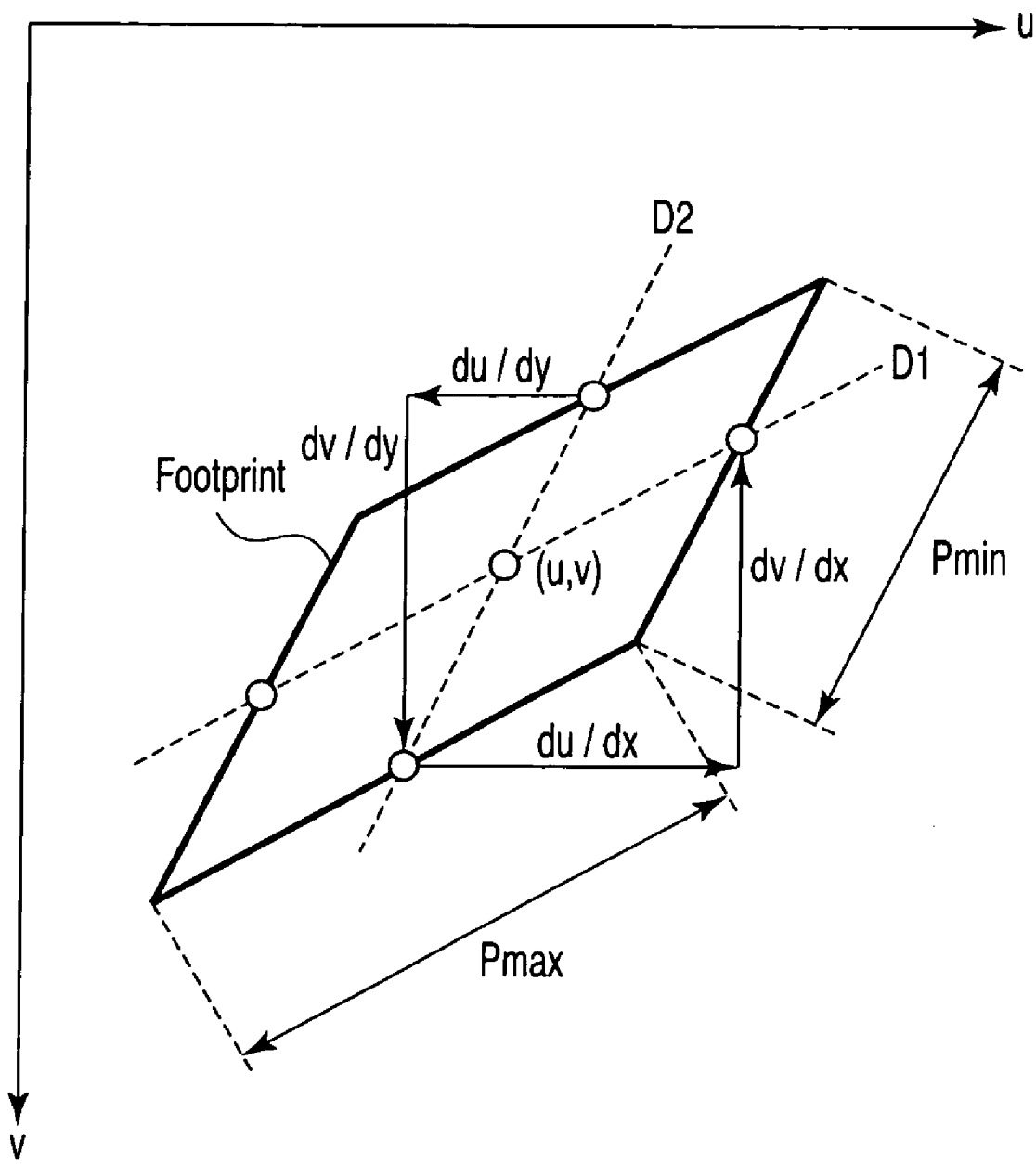
FIG. 12 is a schematic view showing a footprint on a texture in the image process method according to the first embodiment of the invention.

The texture unit 63 first finds Pmax and Pmin in order to calculate ANISOxy and LODxy (step S32). FIG. 12 illustrates this process. FIG. 12 is a uv-coordinate system, and shows a footprint of a pixel.

As is shown in FIG. 12, Pmax is the length of the longer side of the four sides of a rectangular footprint, and Pmin is the length of the shorter side. Thus, Pmax and Pmin can be given by the following equations (4) and (5):

$$P\mathrm{max}=\mathrm{max}(|(du/dx, dv/dx)|, |(du/dy, dv/dy)|) \qquad (4)$$

$$P\mathrm{min}=\mathrm{min}(|(du/dx, dv/dx)|, |(du/dy, dv/dy)|) \qquad (5)$$

where max and min are functions for obtaining maximum and minimum values. Using Pmax and Pmin, ANISOxy is given by the following equation (6):

$$ANISOxy=\mathrm{min}(ceil(P\mathrm{max}/P\mathrm{min}), MAXANISO) \qquad (6)$$

In equation (6), ceil is a function for rounding up a decimal part into an integer, and MAXANISO is a maximum value of the number of sampling points. In short, the smaller of the two, i.e. (length of the longer side/length of the shorter side) of the footprint and the maximum specified number of sampling points, becomes ANISOxy. LODxy is given by the following equation (7):

$$LODxy=\log_2(P\mathrm{max}/ANISOxy) \qquad (7)$$

In the above-described manner, ANISOxy and LODxy are found.

Figure 13:
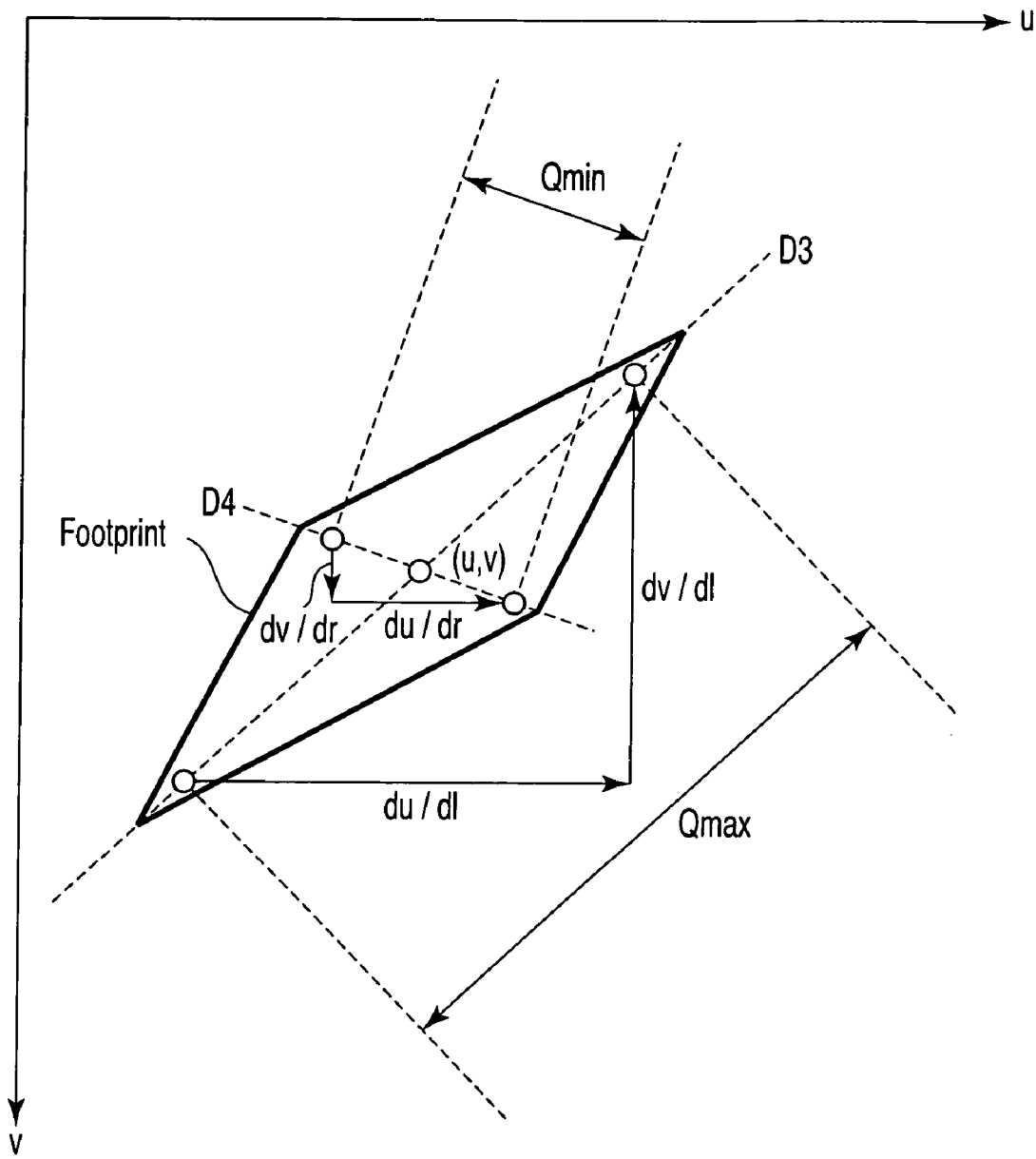
FIG. 13 is a schematic view showing a footprint on a texture in the image process method according to the first embodiment of the invention.

Next, the texture unit 63 finds Qmax and Qmin in order to calculate ANISOlr and LODlr (step S33). FIG. 13 illustrates this process. FIG. 13 is a uv-coordinate system, and shows the footprint of the same pixel as shown in FIG. 12.

As is shown in FIG. 13, Qmax corresponds to the length of the longer diagonal of the footprint, and Qmin corresponds to the length of the shorter diagonal. Thus, Qmax and Qmin can be given by the following equations (8) and (9):

$$Q\mathrm{max}=\mathrm{max}(|(du/dl, dv/dl)|, |(du/dr, dv/dr)|) \qquad (8)$$

$$Q\mathrm{min}=\mathrm{min}(|(du/dl, dv/dl)|, |(du/dr, dv/dr)|) \qquad (9)$$

Using Qmax and Qmin, ANISOlr is given by the following equation (10):

$$ANISOlr=\mathrm{min}(ceil(Q\mathrm{max}/Q\mathrm{min}), MAXANISO) \qquad (10)$$

In short, the smaller of the two, i.e. the (length of the longer diagonal/length of the shorter diagonal) of the footprint and the maximum specified number of sampling points, becomes ANISOlr. On the other hand, LODlr is given by the following equation (11):

$$LODlr=\log_2(Q\mathrm{max}/ANISOlr) \qquad (11)$$

In the above-described manner, ANISOlr and LODlr are found.

Next, the sampling direction (du, dv) is calculated. Like ANISO and LOD, (du, dv) is calculated with respect to not only the x-axis and y-axis but also the l-axis and r-axis. Hereinafter, du and dv for the x-axis and y-axis are referred to as duxy and dvxy, and du and dv for the l-axis and r-axis are referred to as dulr and dvlr.

The texture unit 63 first compares |(du/dx, dv/dx)| and |(du/dy, dv/dy)| in order to calculate duxy and dvxy (step S34). If the comparison result is |(du/dx, dv/dx)|≧|(du/dy, dv/dy)| (step S35), duxy and dvxy are determined by the following equations (12) (step S36):

$$duxy=du/dx$$

$$dvxy=dv/dx \qquad (12)$$

Specifically, in the example shown in FIG. 12, the sampling points are disposed along axis D1.

If the comparison result is |(du/dx, dv/dx)|<|(du/dy, dv/dy)|, duxy and dvxy are determined by the following equations (13) (step S37):

$$duxy=du/dy$$

$$dvxy=dv/dy \qquad (13)$$

Specifically, in the example shown in FIG. 12, the sampling points are disposed along axis D2.

Subsequently, the texture unit 63 compares |(du/dl, dv/dl)| and |(du/dr, dv/dr)| in order to calculate dulr and dvlr (step S38). If the comparison result is |(du/dl, dv/dl)|≧|(du/dr, dv/dr)| (step S39), dulr and dvlr are determined by the following equations (14) (step S40):

$$dulr=du/dl$$

$$dvlr=dv/dl \qquad (14)$$

Specifically, in the example shown in FIG. 13, the sampling points are disposed along axis D3.

If the comparison result is |(du/dl, dv/dl)|<|(du/dr, dv/dr)|, dulr and dvlr are determined by the following equations (15) (step S41):

$$dulr = du/dr$$

$$dvlr = dv/dr \quad (15)$$

Specifically, in the example shown in FIG. 13, the sampling points are disposed along axis D4.

Next, ANISO, LOD and (du, dv) are finally determined. For these values, values that have been calculated with respect to the axis with higher anisotropy are selected. The degree of anisotropy can be calculated on the basis of Pmax/Pmin and Qmax/Qmin. Thus, the greater one of these values may be selected. However, the relationship in magnitude between Pmax/Pmin and Qmax/Qmin is equivalent to that in magnitude between Pmax and Qmax. Accordingly, the texture unit 63 compares Pmax and Qmax (step S42).

If the comparison result is Pmax≧Qmax (step S43), ANISO, LOD and (du, dv) are given by the following equations (16) (step S44):

$$ANISO = ANISOxy$$

$$LOD = LODxy$$

$$(du, dv) = (duxy, dvxy) \quad (16)$$

On the other hand, if Pmax<Qmax, ANISO, LOD and (du, dv) are given by the following equations (17) (step S45):

$$ANISO = ANISOlr$$

$$LOD = LODlr$$

$$(du, dv) = (dulr, dvlr) \quad (17)$$

In short, if Pmax≧Qmax, the filtering is executed by regarding the longer side and the shorter side of the four sides of the rectangle as the major axis and minor axis of anisotropy. If Pmax<Qmax, the filtering is executed by regarding the longer diagonal and the shorter diagonal of the rectangle as the major axis and minor axis of anisotropy.

After the parameters are calculated as described above, the coordinate calculator 71 calculates texture coordinates (u, v) of sampling points (step S22 in FIG. 7). If the number of sampling points is N (N is an integer, and 1, 2, . . . , ANISO), the texture coordinates are calculated by the following equation (18):

$$(u - du/2 + ddu \times N, v - dv/2 + ddv \times N) \quad (18)$$

Figure 14:
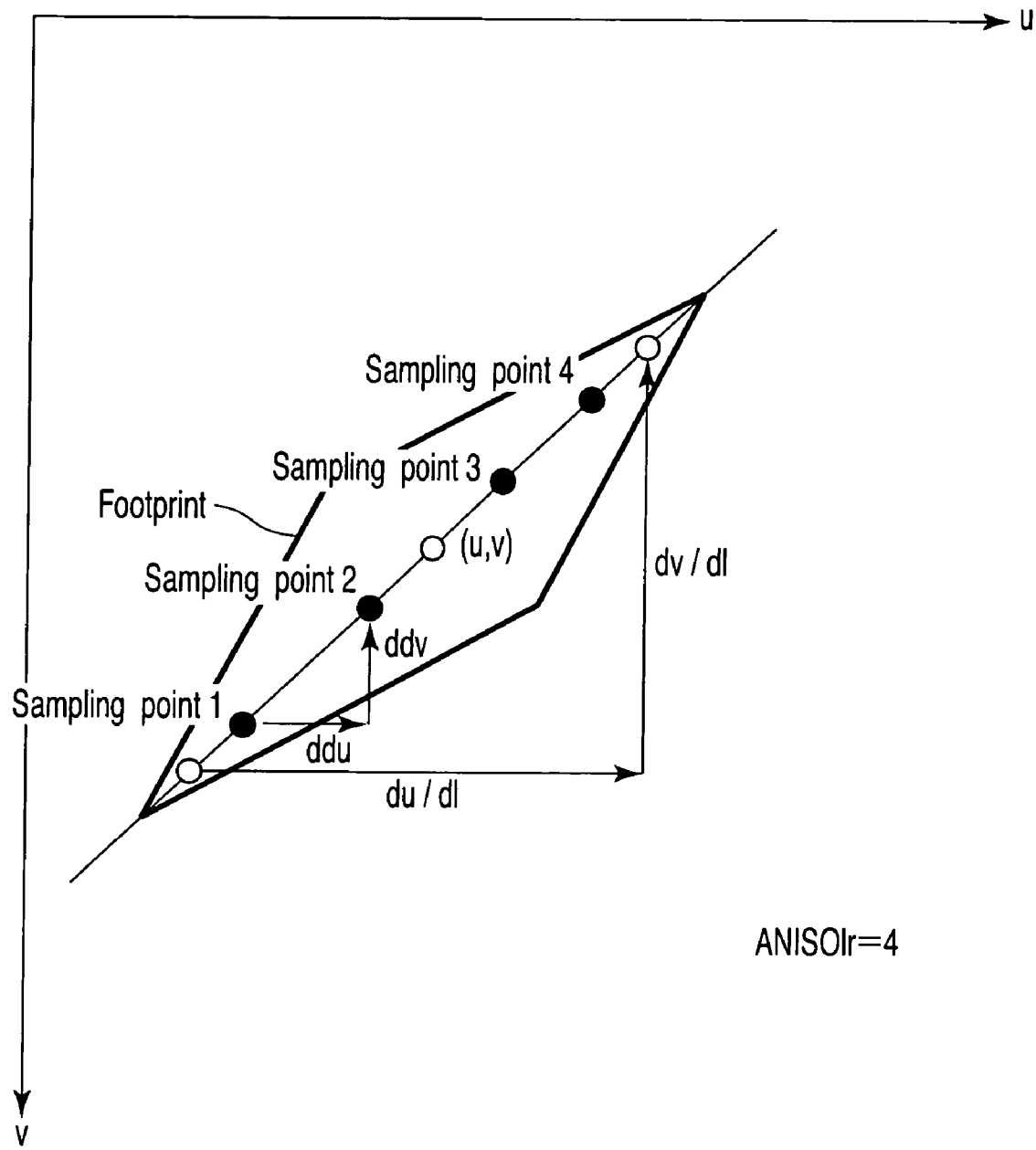
FIG. 14 is a schematic view showing a footprint on a texture in the image process method according to the first embodiment of the invention.

In the example shown in FIG. 12 and FIG. 13, if Qmax>Pmax and ANISO=4, the sampling points are as shown in FIG. 14. FIG. 14 shows texture coordinates. In FIG. 14, ddu and ddv are offsets between sampling points, which are given by the equations (19):

$$ddu = du/(ANISO+1)$$

$$ddv = dv/(ANISO+1) \quad (19)$$

Next, with respect to the coordinates given by equation (18), the sampler 72 executes sampling by selecting a proper MIP map level on the basis of the LOD that is given by equation (16) or (17) (step S23). The accumulator 73 calculates a mean value of sampling results of a plurality of sampling operations (step S24). In this way, the texture mapping is completed.

According to the rendering apparatus and rendering method of the present embodiment as described above, the following advantageous effect (1) is obtained.

(1) It is possible to execute anisotropic filtering with a precisely approximated footprint, while preventing an increase in cost.

With the structure according to the present embodiment, when partial differential coefficients of the texture coordinates are calculated, the l-axis and r-axis, which are at angles of 45° and 135° to the x-axis, are considered as well as the x-axis and y-axis, as shown in FIG. 11. Specifically, LODlr is calculated with respect to the two diagonals of the footprint, in addition to the LOD calculated with respect to the sides of the footprint. Further, the number ANISOlr of sampling points along the diagonals and the sampling direction (dulr, dvlr) are found. Pmax and Qmax are compared. If Pmax is greater, the values that are found with respect to the sides of the footprint are used as LOD, ANISO and (du, dv). If Qmax is greater, the values that are found with respect to the diagonals of the footprint are used as LOD, ANISO and (du, dv). Thus, compared to the prior art, the anisotropy can more exactly be calculated. In other words, the region which is covered as the result of a plurality of MIP mapping operations can be made closer to the shape of the footprint. By using the MIP maps, an increase in cost for calculations can be suppressed, the precision in texture mapping can be enhanced, and the rendering precision of the rendering apparatus can be increased.

Figure 15:
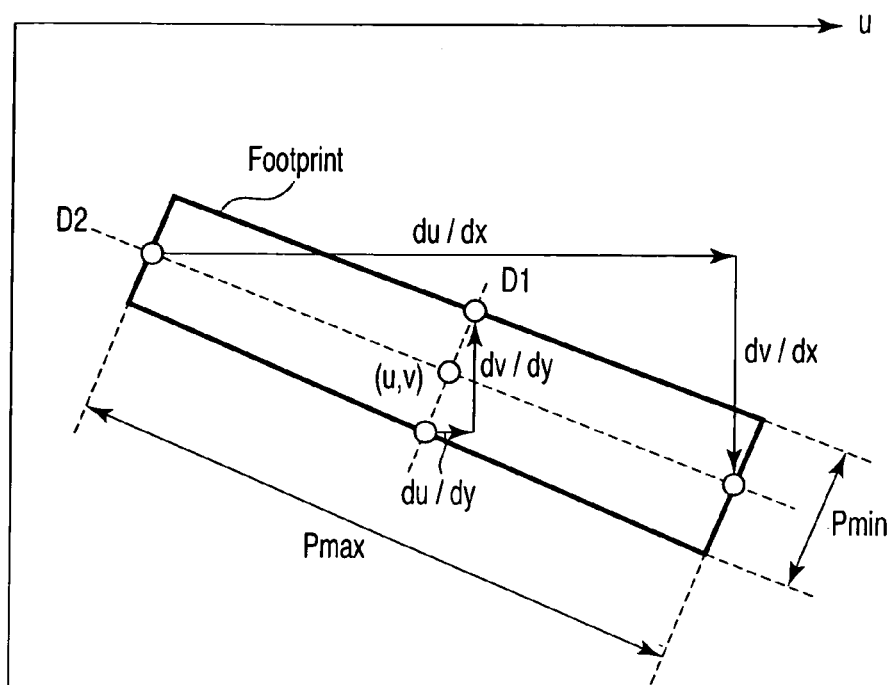
FIG. 15 is a schematic view showing a footprint on a texture in the image process method according to the first embodiment of the invention.
Figure 16:
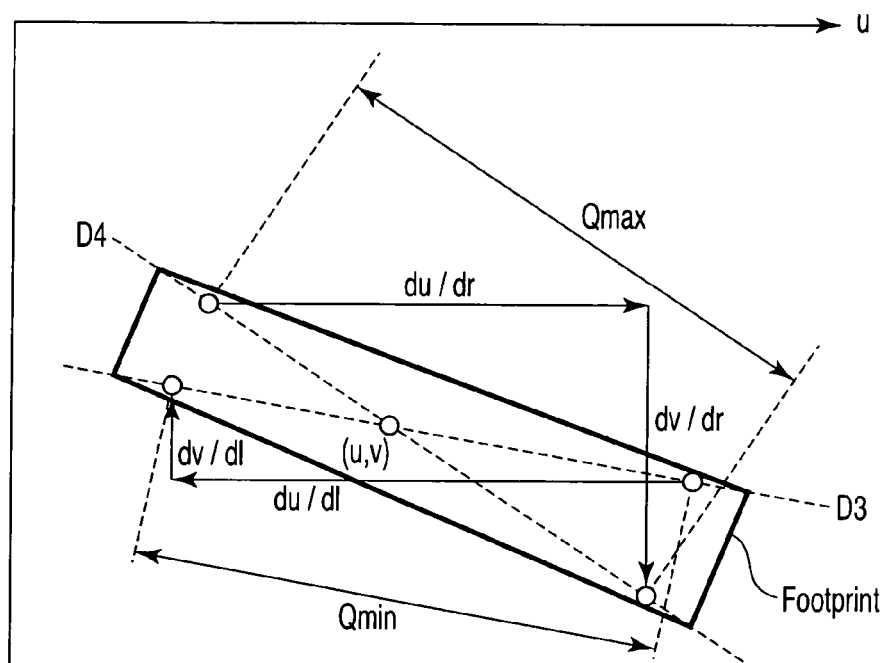
FIG. 16 is a schematic view showing a footprint on a texture in the image process method according to the first embodiment of the invention.

For example, consider the case in which only the x-axis and y-axis are considered when partial differential coefficients are calculated. Assume that the shape of a footprint is rectangular as shown in FIG. 15 and FIG. 16. If Pmax>>Pmin, the anisotropy can correctly be calculated. This also applies to the case of the present embodiment, and ANISOxy, LODxy and (duxy, dvxy) are used as ANISO, LOD and (du, dv). However, if only the x-axis and y-axis are considered, the error in calculation of anisotropy increases as the shape of the footprint becomes more different from a rectangular shape. For example, if the shape of the footprint becomes closer to a diamond shape, as shown in FIG. 17, and Pmax≈Pmin, the degree of anisotropy is evaluated as small. If the shape of the footprint is a perfect diamond and Pmax=Pmin, it is evaluated as perfectly isotropic. Then, ANISO=1 and LOD=$\log_2$(Pmax), and the mapping in this case is equivalent to simple MIP mapping. However, in the present embodiment, if Pmax=Pmin, then Qmax>Pmax. It is thus determined that the direction along the longer diagonal is the direction of anisotropy. Thus, even if the footprint has a perfect diamond shape, anisotropic filtering can be executed. In the meantime, in order to determine anisotropy, it is possible to adopt a method in which the area of the footprint is considered in place of Pmin. However, compared to this method, the method of calculation according to the present embodiment can achieve a higher precision in approximation of the footprint in the case where the shape of the footprint is closer to a diamond shape.

Next, an image rendering apparatus and an image rendering method according to a second embodiment of the present invention are described. In the second embodiment, the calculation formulae in the first embodiment are modified so as to be suitable for hardware-based architecture. Since the structure of the LSI 10 and the rendering method are common to the first embodiment, a description thereof is omitted. The calculation method in the parameter calculator 70 is mainly described below. A real value is expressed in the form of m×$2^e$ by a mantissa part m and an exponent part e.

Figure 10:
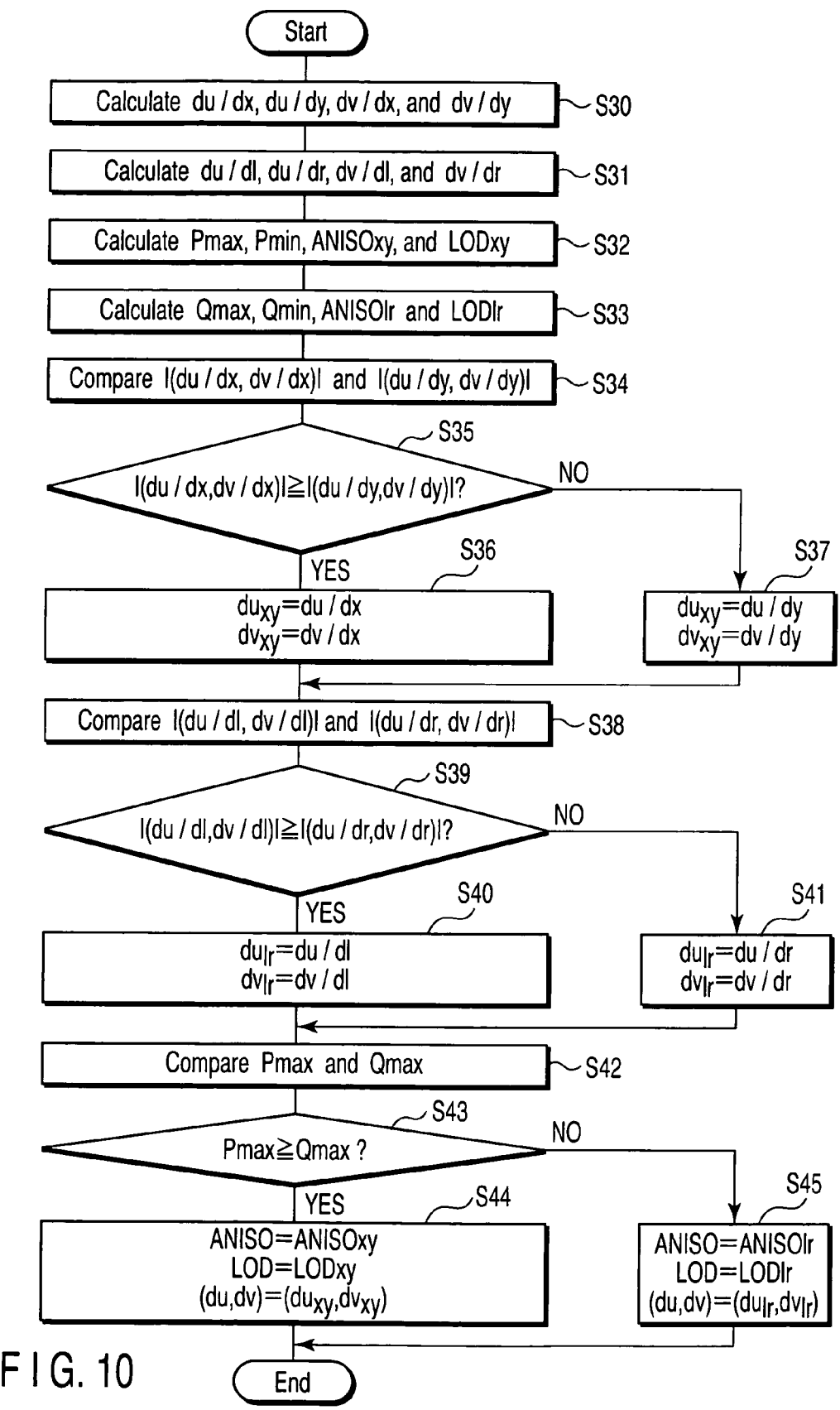
FIG. 10 is a flow chart illustrating an image process method according to the first embodiment of the invention.

To start with, in step S30 in FIG. 10, the parameter calculator 70 finds partial differential coefficients du/dx, du/dy, dv/dx, and dv/dy on texture coordinates in the 0° direction (x-axis) and the 90° direction (y-axis) on the frame buffer. These values are found by the above-mentioned equations (2). Subsequently, the parameter calculator 70 finds partial differential coefficients du/dr, du/dl, dv/dr, and dv/dl of texture coordinates with respect to the l-axis and the r-axis (step S31). In this case, these values are found by the following equations (20) in place of the above-mentioned equations (3):

$$du/dl = p11.u - p00.u$$

$$dv/dl = p11.v - p00.v$$

$$du/dr = p10.u - p01.u$$

$$du/dr = p10.v - p01.v \quad (20)$$

The division by $\sqrt{2}$ is eliminated from the equations (3). The reason is that the absolute value of the vector is found on the basis of $L^2$ norm, and the norm itself is not found and the square thereof is found. Thereby, the calculation of the square root becomes needless. The correction of the division by $\sqrt{2}$, which is omitted in the equations (20), can be executed by the division by 2 in equation (22). The $L^2$ norm is given by the following equation (21):

$$L^2 \text{ norm: } |(x, y)| = \sqrt{(x^2+y^2)} \quad (21)$$

The norms for the respective vectors are given by the following equations (22):

$$|(du/dx, dv/dx)|^2 = (du/dx)^2 + (dv/dx)^2$$

$$|(du/dy, dv/dy)|^2 = (du/dy)^2 + (dv/dy)^2$$

$$|(du/dl, dv/dl)|^2 = ((du/dl)^2 + (dv/dl)^2)/2$$

$$|(du/dr, dv/dr)|^2 = ((du/dr)^2 + (dv/dr)^2)/2 \quad (22)$$

The magnitude relation between these norms can be determined with the squared values being used.

Specifically, the equations (4), (5), (8) and (9) in the first embodiment are modified into the following equations (23) to (26):

$$P\text{max}^2 = \max(|(du/dx, dv/dx)|^2, |(du/dy, dv/dy)|^2) \quad (23)$$

$$P\text{min}^2 = \min(|(du/dx, dv/dx)|^2, |(du/dy, dv/dy)|^2) \quad (24)$$

$$Q\text{max}^2 = \max(|(du/dl, dv/dl)|^2, |(du/dr, dv/dr)|^2) \quad (25)$$

$$Q\text{min}^2 = \min(|(du/dl, dv/dl)|^2, |(du/dr, dv/dr)|^2) \quad (26)$$

The calculations with respect to the x-axis direction and y-axis direction will be described below. Since the calculations relating to the l-axis direction and r-axis direction are similar, a description thereof is omitted.

In order to simplify subsequent-stage calculations, ANISO is limited to a power of 2. In the equation (6), the decimal part of Pmax/Pmin is rounded up into an integer. In the present embodiment, a power of 2 of a value close to Pmax/Pmin is obtained. Assume now that $P\text{max}^2$ is expressed by a mantissa part Mmax and an exponent part Emax, and $P\text{min}^2$ is expressed by a mantissa part Mmin and an exponent part Emin. For instance, ANISOxy can be calculated by the following equations (27) and (28):

$$ANISO\_EXP = (Emax - Emin - m + BIAS)/2 \quad (27)$$

$$ANISOxy = \min(2^{ANISO\_EXP}, MAXANISO) \quad (28)$$

If Mmax<Mmin, then m=1. Otherwise, m=0. The equations (27) and (28) can be derived since Pmax/Pmin can be expressed by the following equation (29):

$$P\text{max}/P\text{min} = (P\text{max}^2/P\text{min}^2)^{1/2} = ((M\text{max}/M\text{min}) \times 2^{(Emax-Emin)})^{1/2} \quad (29)$$

When Mmax<Mmin, the exponent part decreases by 1. Thus, m=1. BIAS adjusts rounding up/down when the value of Pmax/Pmin is rounded to a power of 2. In the case where BIAS=0, when Pmax/Pmin is in the range of $[2^n, 2^{n+1}]$ (n: an integer), ANISO is $2^n$ and therefore it is rounded down. In the case where BIAS=2, when Pmax/Pmin is in the range of $[2^n, 2^{n+1}]$ (n: an integer), ANISO is $2^{n+1}$ and therefore it is rounded up. In the case where BIAS=1, when Pmax/Pmin is in the range of $[\sqrt{(2)} \times 2^n, \sqrt{(2)} \times 2^{n+1})$, ANISO is $2^{n+1}$ and $\sqrt{(2)} \times 2^n$ becomes a boundary value between rounding up and rounding down.

Assume that in the equation (28), MAXANISO is a power of 2.

Hence, the division in the equation (6) is omitted.

Since ANISO is a power of 2, the LOD is calculated by modifying the equation (7) in the first embodiment to the following equation (30):

$$LODxy = \log_2(P\text{max}^2/(2^{ANISO\_EXP})^2)/2 = \log_2(M\text{max} \times 2^{(Emax - 2 \times ANISO\_EXP)})/2 \quad (30)$$

Specifically, double the ANISO_EXP is subtracted from the exponent part of $P\text{max}^2$, and the base-2 logarithm of the subtraction result is calculated. The logarithm of a real number that is expressed in the form of $m \times 2^e$ is calculated by the following equation (31):

$$\log_2(m \times 2^e) = e + \log_2(m) \quad (31)$$

In equation (31), $\log_2(m)$ may be calculated with reference to a table, or may be approximated by the following equation (32) on the preposition that the mantissa part m is normalized in the range of [1, 2]:

$$\log_2(m) = m - 1 \quad (32)$$

By the above modification, the division in equation (7) is omitted.

The direction (du, dv) in which sampling points are disposed is the same as in the equations (12) and (13). However, since the vector norms are retained as squared values, comparison is executed with these squared values without square root calculations. If $|(du/dx, dv/dx)|^2 \geq |(du/dy, dv/dy)|^2$, $$duxy = du/dx$$

$$dvxy = dv/dx \quad (33)$$

In the example shown in FIG. 12, sampling points are disposed along the axis D1. If $|(du/dx, dv/dx)|^2 < |(du/dy, dv/dy)|^2$, $$duxy = du/dy$$

$$dvxy = dv/dy \quad (34)$$

The above modifications are applied to the equations (10), (11), (14) and (15), and the final ANISO, LOD and (du, dv) are determined by the equations (16) and (17).

The texture coordinates of sampling points are found by the following equations (35) and (36) by modifying the equations (18) and (19):

$$(u-du/2-ddu/2+ddu \times N, v-dv/2-ddv/2+ddv \times N) \quad (35)$$

$$ddu = du/ANISO$$

$$ddv = dv/ANISO \quad (36)$$

In equation (36), since ANISO is a power of 2, the division becomes subtraction of the exponent part. The division by (ANISO+1) in the equation (19) is altered to the division by ANISO. If the coordinates are calculated by the equation (18), the sampling points do not become symmetric with respect to the original texture coordinates (u, v). Thus, in the equation (35), correction is made with an offset of (−ddu/2, −ddv/2). In this case, du/2, dv/2, ddu/2 and ddv/2 can be calculated by subtracting 1 from the exponent part.

With use of the calculation method according to the present embodiment, the following advantageous effect (2) can be obtained in addition to the above-described advantageous effect (1) of the first embodiment.

(2) The hardware architecture of the texture unit can be simplified.

According to the above-described method, as indicated by the equation (20), the division by $\sqrt{2}$ can be omitted from the partial differentiation. The division by 2 in the equation (22) for correcting the division by $\sqrt{2}$ can be executed by subtracting 1 from the exponent part. Therefore, the circuit configuration can be simplified and the calculation cost can be reduced.

In addition, as indicated in the equation (28), ANISO is expressed by a power of 2. Thus, in the calculation of ANISO, consideration may be given to only the exponent part ANISO_EXP. In this case, integer arithmetic operations are executed in the equations (27) and (28). Since calculations for decimal parts are needless, the circuit configuration can be simplified. Further, the division in the equation (6) can be omitted. In addition, only the relationship in magnitude between the mantissa parts Mmax and Mmin in the equation (27) is needed in order to find the value of m. Thus, the precision in these values Mmax and Mmin may be low. Accordingly, the precision in the mantissa part in the equations (23) to (26) of the vector norms can be lowered, and the cost for calculations can be reduced.

Since ANISO is rounded to a power of 2, a tradeoff occurs between the image quality and the calculation speed. In a case where ANISO is rounded to a smaller power of 2 by setting BIAS=0, the number of sampling points becomes less than the normally required number and the image quality deteriorates. However, since the number of times of sampling decreases, the calculation speed increases. Conversely, in a case where the rounding to a greater power of 2 is performed by setting BIAS=2, the image quality increases but the calculation speed decreases. Thus, by setting BIAS=1, an intermediate image quality and calculation speed can be obtained. Even if the number of times of sampling is increased in order to secure the image quality, merely the number of repetitions of the same process increases, so the area of the circuit will not increase.

Further, by using modifications of the equations (30), (31) and (32), the division and the logarithm at the time of LOD calculations can be omitted.

As has been described above, by modifying the calculation formulae as in this embodiment, the circuit configuration can be simplified and the cost for calculations can be reduced. FIG. 18 and FIG. 19 show sampling points in the case of using the method of this embodiment. FIG. 18 and FIG. 19 show footprints on texture coordinates. FIG. 18 shows a case in which the side corresponding to the x-axis direction is determined to be the major axis of anisotropy, and FIG. 19 shows a case in which the diagonal corresponding to the l-axis direction is determined to be the major axis of anisotropy.

As is shown in FIG. 18, the interval ddu, ddv between sampling points is greater than in the case of equations (18) and (19). However, since all sampling points fall within the footprint, the quality of filtering does not greatly vary. In the case of FIG. 19, the division by $\sqrt{2}$ is omitted from the equation (14) in the first embodiment. Thus, the interval ddu, ddv between sampling points increases, too. However, since all sampling points fall within the footprint, the quality of filtering does not deteriorate.

Next, an image rendering apparatus according to a third embodiment of the present invention is described. This embodiment relates to a hardware architecture that realizes the parameter calculator 70 included in the texture unit 63 of the first embodiment. In the other respects, the third embodiment is common to the first embodiment, so a description of common parts is omitted.

FIG. 20 is a block diagram of the parameter calculator 70. As shown in FIG. 20, the parameter calculator 70 comprises a partial differentiation unit 80, an (xy, lr) parameter calculation unit 81 and a parameter decision unit 82. These units will be described below in detail.

Figure 21:
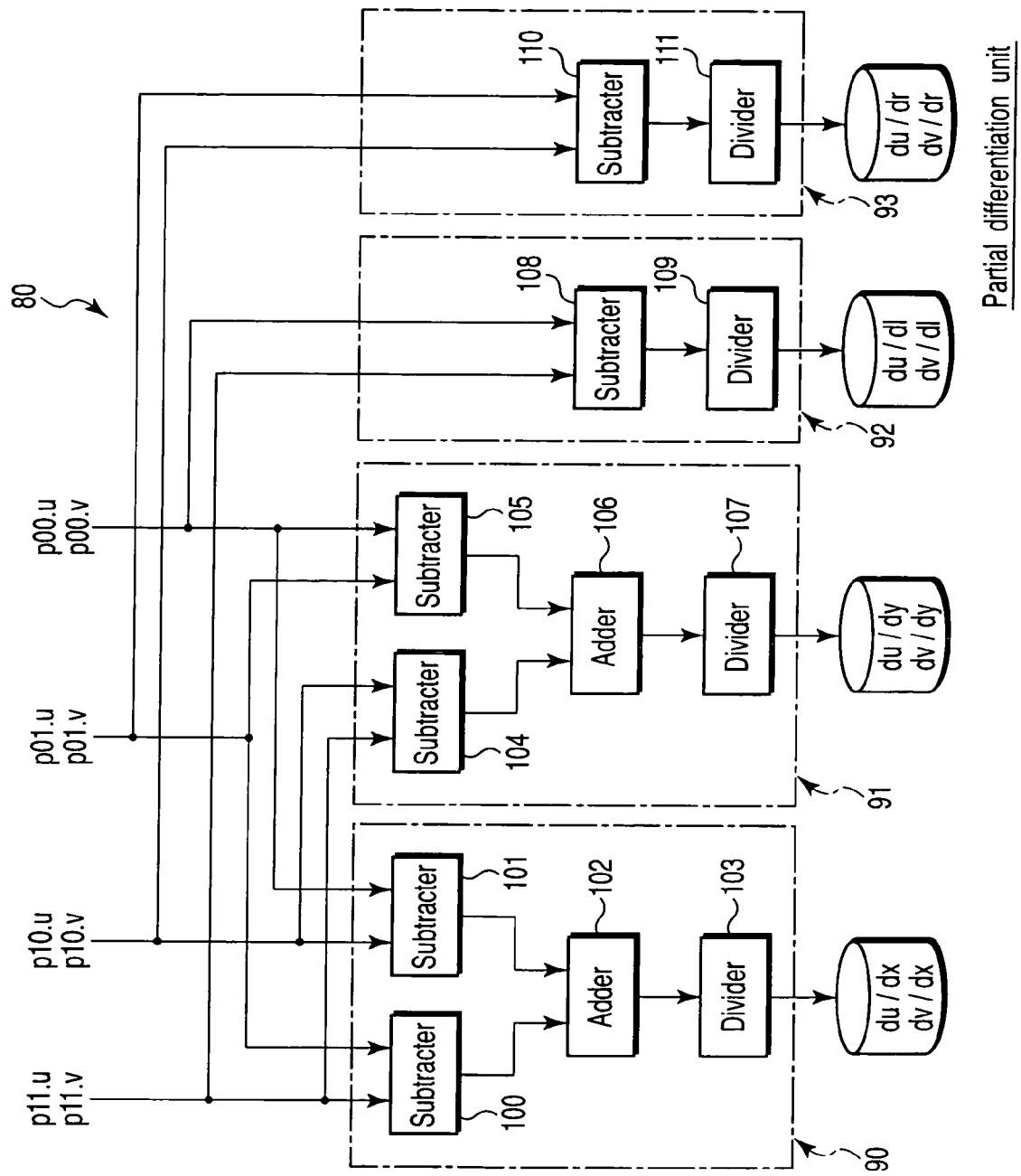
FIG. 21 is a block diagram that shows a partial differentiation unit that is included in the texture unit according to the third embodiment of the invention.

FIG. 21 is a circuit diagram of the partial differentiation unit 80. As shown in FIG. 21, the partial differentiation unit 80 comprises an x-differentiation circuit 90, a y-differentiation circuit 91, an l-differentiation circuit 92 and an r-differentiation circuit 93. The x-differentiation circuit 90 includes subtracters 100 and 101, an adder 102 and a divider 103. The subtracter 100 executes subtraction between (p11.u) and (p01.u), and subtraction between (p11.v) and (p01.v). The subtracter 101 executes subtraction between (p10.u) and (p00.u), and subtraction between (p10.v) and (p00.v). The adder 102 adds a subtraction result of the subtracter 100 and a subtraction result of the subtracter 101. The divider 103 divides the addition result of the adder 102 by 2. Thus, du/dx and dv/dx indicated in the equation (2) are obtained.

The y-differentiation circuit 91 includes subtracters 104 and 105, an adder 106 and a divider 107. The subtracter 104 executes subtraction between (p11.u) and (p10.u), and subtraction between (p11.v) and (p10.v). The subtracter 105 executes subtraction between (p01.u) and (p00.u), and subtraction between (p01.v) and (p00.v). The adder 106 adds a subtraction result of the subtracter 104 and a subtraction result of the subtracter 105. The divider 107 divides the addition result of the adder 106 by 2. Thus, du/dy and dv/dy indicated in the equation (2) are obtained.

The l-differentiation circuit 92 includes a subtracter 108 and a divider 109. The subtracter 108 executes subtraction between (p11.u) and (p00.u), and subtraction between (p11.v) and (p00.v). The divider 109 divides the subtraction result of the subtracter 108 by $\sqrt{2}$. Thus, du/dl and dv/dl indicated in the equation (3) are obtained.

The r-differentiation circuit 93 includes a subtracter 110 and a divider 111. The subtracter 110 executes subtraction between (p10.u) and (p01.u), and subtraction between (p10.v) and (p01.v). The divider 111 divides the subtraction result of the subtracter 110 by $\sqrt{2}$. Thus, du/dr and dv/dr indicated in the equation (3) are obtained.

Figure 22:
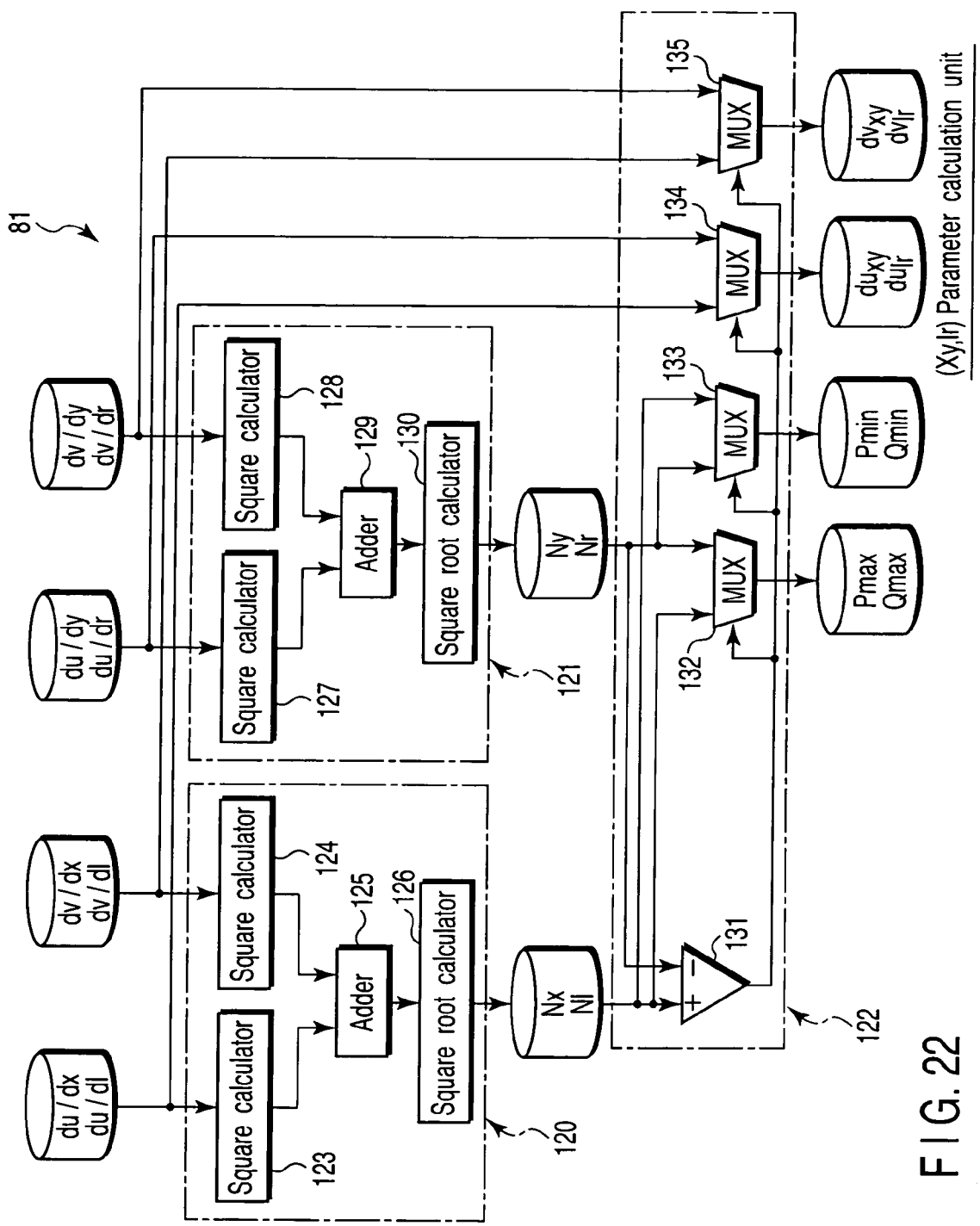
FIG. 22 is a block diagram that shows an (xy, lr) parameter calculation unit that is included in the texture unit according to the third embodiment of the invention.

FIG. 22 is a circuit diagram of the (xy, lr) parameter calculation unit 81. As shown in FIG. 22, the parameter calculation unit 81 comprises an xl-axis coordinate calculator 120, a yr-axis coordinate calculator 121 and a selector 122.

The xl-axis coordinate calculator 120 executes calculations relating to x and l in the equations (4), (5), (8) and (9), and includes square calculators 123 and 124, an adder 125 and a square root calculator 126. The square calculator 123 calculates $(du/dx)^2$ and $(du/dl)^2$. The square calculator 124 calculates $(dv/dx)^2$ and $(dv/dl)^2$. The adder 125 executes addition of $(du/dx)^2$ and $(dv/dx)^2$ and addition of $(du/dl)^2$ and $(dv/dl)^2$, which are obtained by the square calculators 123 and 124. The square root calculator 126 calculates a square root of the calculation result of the adder 125. As a result, Nx and Nl indicated in the following equation (37) are obtained:

$$Nx = \sqrt{((du/dx)^2 + (dv/dx)^2)}$$

$$Nl = \sqrt{((du/dl)^2 + (dv/dl)^2)} \quad (37)$$

The yr-axis coordinate calculator 121 executes calculations relating to y and r in the equations (4), (5), (8) and (9), and includes square calculators 127 and 128, an adder 129 and a square root calculator 130. The square calculator 127 calculates $(du/dy)^2$ and $(du/dr)^2$. The square calculator 128 calculates $(dv/dy)^2$ and $(dv/dr)^2$. The adder 129 executes addition of $(du/dy)^2$ and $(dv/dy)^2$ and addition of $(du/dr)^2$ and $(dv/dr)^2$, which are obtained by the square calculators 127 and 128. The square root calculator 130 calculates a square root of the calculation result of the adder 129. As a result, Ny and Nr indicated in the following equation (38) are obtained:

$$Ny = \sqrt{((du/dy)^2 + (dv/dy)^2)}$$

$$Nr = \sqrt{((du/dr)^2 + (dv/dr)^2)} \quad (38)$$

The selector 122 includes a comparator 131 and selector circuits 132 to 135. The comparator 131 compares Nx and Ny, and Nl and Nr.

The selector circuit 132 outputs Nx as Pmax when the comparison result of the comparator 131 is Nx$\geq$Ny, and outputs Ny as Pmax when the comparison result is Nx<Ny. In addition, the selector circuit 132 outputs Nl as Qmax when Nl$\geq$Nr, and outputs Nr as Qmax when Nl<Nr. The selector circuit 133 selects Nx or Ny, and Nl or Nr according to the rule reverse to the rule of the selector circuit 132, and outputs the selected values as Pmin and Qmin.

The selector circuit 134 outputs du/dx as duxy when the comparison result of the comparator 131 is Nx$\geq$=Ny, and outputs du/dy as duxy when the comparison result is Nx<Ny. In addition, the selector circuit 134 outputs du/dl as dulr when Nl$\geq$Nr, and outputs du/dr as dulr when Nl<Nr.

The selector circuit 135 outputs dv/dx as dvxy when the comparison result of the comparator 131 is Nx$\geq$Ny, and outputs dv/dy as dvxy when the comparison result is Nx<Ny. In addition, the selector circuit 135 outputs dv/dl as dvlr when Nl$\geq$Nr, and outputs dv/dr as dvlr when Nl<Nr.

In this way, the equations (4), (5), (8), (9), (12) to (15), and (21) are executed.

Figure 23:
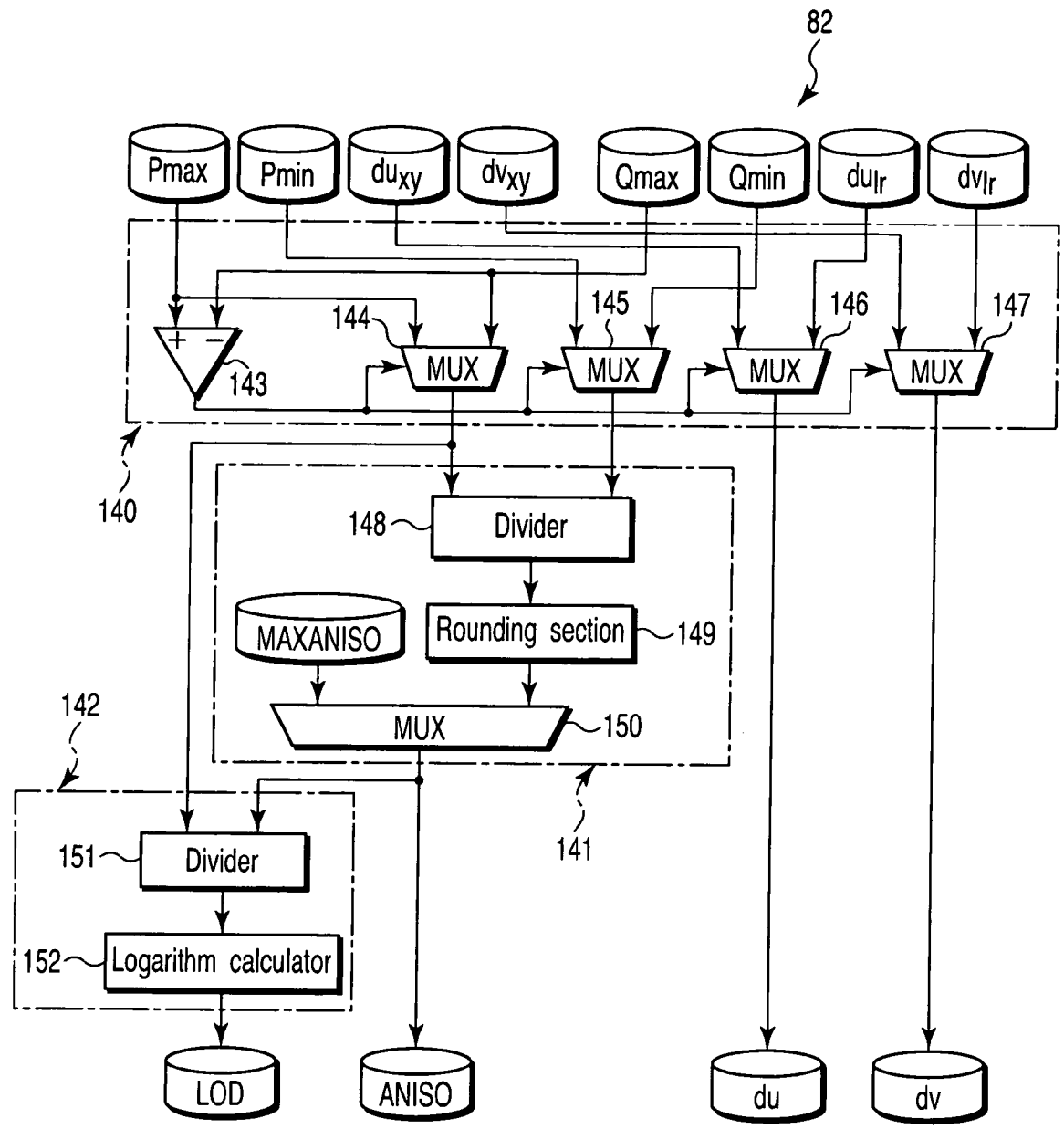
FIG. 23 is a block diagram that shows a parameter decision unit that is included in the texture unit according to the third embodiment of the invention.

FIG. 23 is a circuit diagram of the parameter decision unit 82. The parameter decision unit 82 executes the equations (6), (7), (10), (11), (16) and (17). As is shown in FIG. 23, the parameter decision unit 82 includes a selector 140, an ANISO calculator 141 and a LOD calculator 142. The selector 140 includes a comparator 143 and selector circuits 144 to 147. The comparator 143 compares Pmax and Qmax.

The selector circuit 144 outputs Pmax when the comparison result in the comparator 143 is Pmax$\geq$Qmax, and outputs Qmax when the comparison result is Pmax<Qmax.

The selector circuit 145 outputs Pmin when Pmax$\geq$Qmax, and outputs Qmin when Pmax<Qmax. The selector circuit 146 outputs duxy as final du when Pmax$\geq$Qmax, and outputs dulr as final du when Pmax<Qmax. The selector circuit 147 outputs dvxy as final dv when Pmax$\geq$Qmax, and outputs dvlr as final dv when Pmax<Qmax.

The ANISO calculator 141 includes a divider 148, a rounding section 149, and a selector circuit 150. The divider 148 executes division, (Pmax/Pmin) or (Qmax/Qmin), of the outputs of the selector circuits 144 and 145. The rounding section 149 rounds up a decimal part of the calculation result of the divider 148 into an integer. The selector circuit 150 selects the smaller of the output of the rounding section 149 and MAXANISO, and outputs the selected value as final ANISO.

The LOD calculator 142 includes a divider 151 and a logarithm calculator 152. The divider 151 executes division, (Pmax/ANISO) or (Qmax/ANISO), of the output of the selector circuit 144 and the output of the selector circuit 150. The logarithm calculator 152 calculates a logarithm ($\log_2$) of the output of the divider 152, and outputs the calculation result as final LOD.

In this way, the LOD, ANISO and (du, dv) can be calculated. Calculations relating to the xy axis and lr axis in the partial differentiation unit 80 and (xy, lr) parameter calculation unit 81 can be executed with use of the same circuit by performing calculations at different cycles. Specifically, in the partial differentiation unit 80, the circuit that is used for the partial differentiation of the u-coordinate can be used for partial differentiation of the v-coordinate. In addition, in the (xy, lr) parameter calculation unit 81, the parameter calculation circuit relating to the xy direction can be used for the parameter calculation relating to the lr direction. Needless to say, it is possible to provide two identical circuits for the calculations relating to the xy axis and the calculation relating to the lr axis, respectively.

Next, an image rendering apparatus according to a fourth embodiment of the present invention is described. This embodiment relates to a hardware architecture that realizes the parameter calculator 70 included in the texture unit 63 of the second embodiment. Only different points from the third embodiment will be described below.

The block configuration of the parameter calculator 70 is the same as shown in FIG. 20. FIG. 24 is a circuit diagram of the partial differentiation unit 80. As shown in FIG. 24, the partial differentiation unit 80 is constructed by removing the dividers 109 and 111 from the structure shown in FIG. 21 that has been described in connection with the third embodiment. The equations (2) and (20) are executed by this structure.

Figure 25:
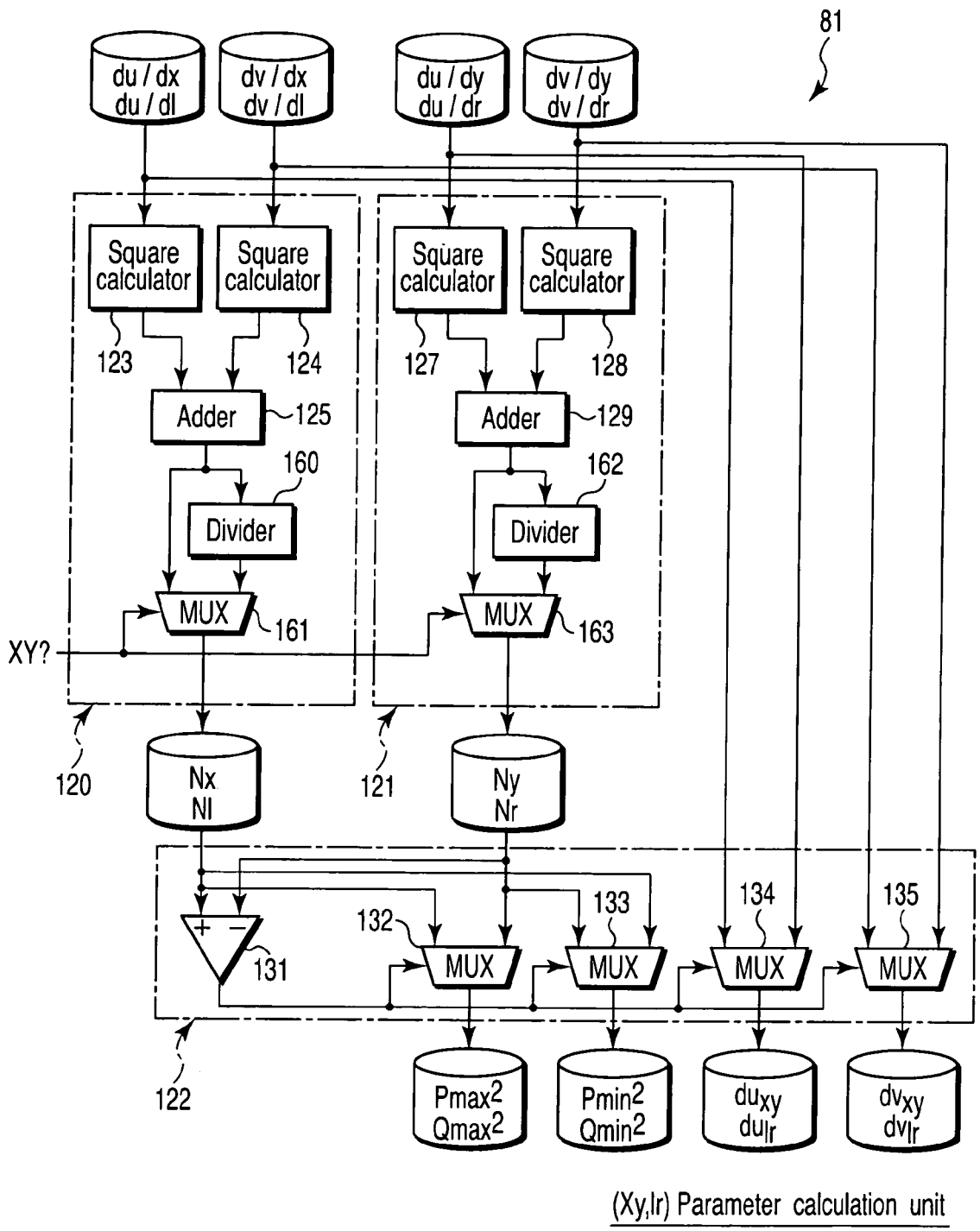
FIG. 25 is a block diagram that shows an (xy, lr) parameter calculation unit that is included in the texture unit according to the fourth embodiment of the invention.

FIG. 25 is a block diagram of the (xy, lr) parameter calculation unit 81. As shown in FIG. 25, the parameter calculation unit 81 is constructed by replacing the square root calculators 126 and 130, which are provided in the structure shown in FIG. 22 that has been described in connection with the third embodiment, by a divider 160 and a selector circuit 161, and a divider 162 and a selector circuit 163, respectively.

With respect to the x-axis and y-axis, the selector circuit 161 selects a calculation result, $((du/dx)^2+(dv/dx)^2)$, of the adder 125 and outputs it as Nx, and the selector circuit 163 selects a calculation result, $((du/dy)^2+(dv/dy)^2)$, of the adder 129 and outputs it as Ny. With respect to the l-axis and r-axis, the dividers 160 and 162 divide outputs from the adders 125 and 129 by 2. The division results, $(((du/dl)^2+(dv/dl)^2)/2)$ and $(((du/dr)^2+(dv/dr)^2)/2)$, are output as Nl and Nr. That is, the equation (22) is executed. In accordance with the comparison results between Nx and Ny and between Nl and Nr, the selector 122 outputs execution results of equations (23) to (26), (33) and (34).

Figure 26:
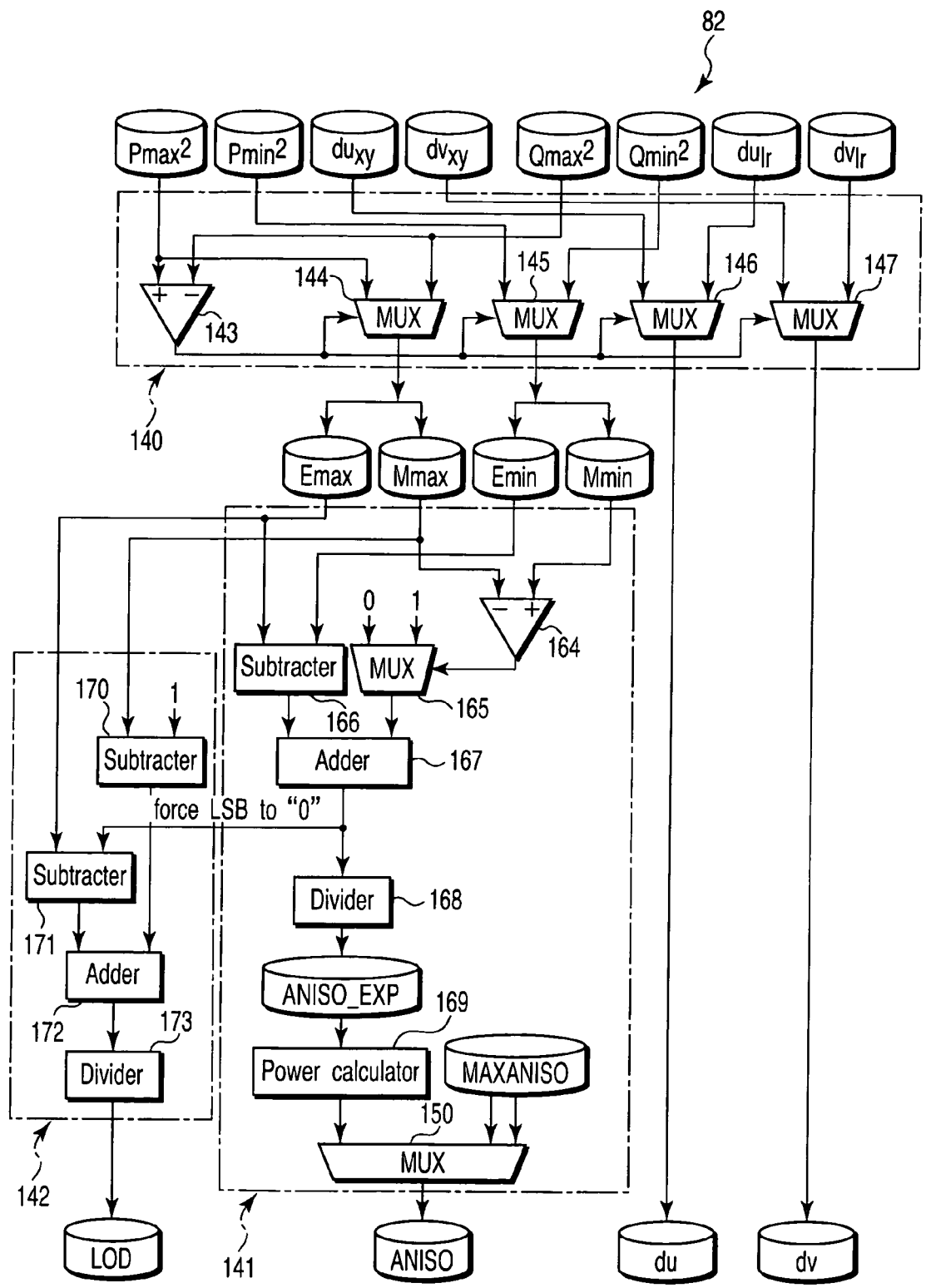
FIG. 26 is a block diagram that shows a parameter decision unit that is included in the texture unit according to the fourth embodiment of the invention.

FIG. 26 is a circuit diagram of the parameter decision unit 82. The parameter decision unit 82 executes the equations (27), (28), (30), (31) and (32). Unlike the third embodiment, $Pmax^2$, $Pmin^2$, $Qmax^2$ and $Qmin^2$ are substituted for Pmax, Pmin, Qmax and Qmin. The selector 140 has the same structure as in the third embodiment. As has been described in connection with the second embodiment, $Pmax^2$ and $Qmax^2$ are expressed by the mantissa part Mmax and exponent part Emax, and $Pmin^2$ and $Qmin^2$ are expressed by the mantissa part Mmin and exponent part Emin. Thus, the selector circuit 144 outputs the mantissa part Mmax and exponent part Emax of $Pmax^2$ or $Qmax^2$, and the selector circuit 145 outputs the mantissa part Mmin and exponent part Emin of $Pmin^2$ or $Qmin^2$.

The ANISO calculator 141 includes a comparator 164, selector circuits 165 and 150, a subtracter 166, an adder 167, a divider 168, and a power calculator 169. The comparator compares Mmax and Mmin. The selector circuit 165 selects 0 when Mmax<Mmin in the comparator 164, and selects 1 in other cases, and outputs the selected value as (−m+BIAS) =m' in the equation (27) (BIAS=1). The subtracter 166 calculates (Emax−Emin). The adder 167 adds the output of the subtracter 166 and the output of the selector circuit 165. The divider 168 divides the output of the adder 167 by 2, and outputs ANISO_EXP that is given by the equation (27). Then, the power calculator 169 calculates $2^{ANISO\_EXP}$. The calculation of the power can be executed in the binary representation by shifting "1" to the left (to the upper-bit side) by the amount of the input value. The selector circuit 150 selects the smaller of the output of the power calculator 169 and MAXANISO and executes the equation (28). As a result, final ANISO is obtained. In the second embodiment, the value calculated by the equation (28) is not the final ANISO. In the present embodiment, however, ANISO is calculated after Pmax and Qmax are compared. Thus, the value obtained at this stage becomes ANISO that is finally used.

The LOD calculator 142 executes the equation (30), and includes subtracters 170 and 171, an adder 172, and a divider 173. The subtracter 170 subtracts 1 from Mmax. Thereby, the approximation of the equation (32) is executed, and $\log_2(Mmax)$ can be calculated. The subtracter 171 calculates $\log_2(2^{(Emax-2 \times ANISO\_EXP)})$ That is, (Emax−2×ANISO_EXP) is calculated. (2×ANISO_EXP) can be obtained by setting the least significant bit LSB of (Emax−Emin+m'), which is the output of the adder 167, to zero. Thus, the subtracter 171 subtracts, from Emax, the result that is obtained by setting the LSB of the output of the adder 167 to zero. Thereafter, the adder 172 adds the outputs of the subtracters 170 and 171. As a result, $\log_2(Mmax \times 2^{(Emax-2 \times ANISO\_EXP)})$ is obtained. Then, the divider 173 divides the output of the adder 172 by 2, and the calculation of the equation (30) is completed. Final LOD is thus obtained. In the second embodiment, like ANISO, the value calculated by the equation (30) has been described as not being the final LOD. However, in the present embodiment, LOD is calculated after Pmax and Qmax are compared. Therefore, the value obtained at this stage becomes LOD that is finally used.

By using the calculation method of the second embodiment as described above, the division by $\sqrt{2}$ and logarithm calculation can be omitted. Compared to the structure of the third embodiment, the number of components increases. However, since the amount of calculations in each part is small, the actual circuit area can be reduced.

As has been described above, according to the image rendering apparatus and image rendering method of the first to fourth embodiments of the invention, when anisotropic texture mapping is performed, anisotropy is determined by considering not only the direction along the sides of the footprint, but also the direction along the diagonals of the footprint. Even in the case where the longer side and the shorter side of the footprint are nearly equal, anisotropy can be determined with higher precision. As a result, the precision in anisotropic filtering is enhanced, and texture mapping with higher image quality can be performed. Hence, the precision in image rendering in the image rendering apparatus can be improved.

In steps S35, S39 and S43 in the above-described embodiments, the conditions for branching are set to be |(du/dx, dv/dx)|≧|(du/dy, dv/dy)|, |(du/dl, dv/dl)|≧|(du/dr, dv/dr)|, and Pmax≧Qmax, respectively. Alternatively, these conditions may be set to be |(du/dx, dv/dx)|>|(du/dy, dv/dy)|, |(du/dl, dv/dl)|>|(du/dr, dv/dr)|, and Pmax>Qmax. The reason is that when two values to be compared are equal, the same calculation result is obtained whether the calculation is based on the xy directions or the lr directions.

In FIG. 10, Pmax and Qmax may be compared after step S33. If Pmax is greater than Qmax, the calculations in steps S38 to S43 and S45 are needless. In the reverse case, steps S34 to s37 and S42 to S44 are needless. Further, as in the third and fourth embodiments, in steps S32 and S33, only Pmax, Pmin, Qmax and Qmin may be calculated, and ANISO and LOD may be calculated after comparison between Pmax and Qmax. Thereby, without executing selection in steps S43 to S45, final ANISO and LOD can be calculated.

Figure 27:
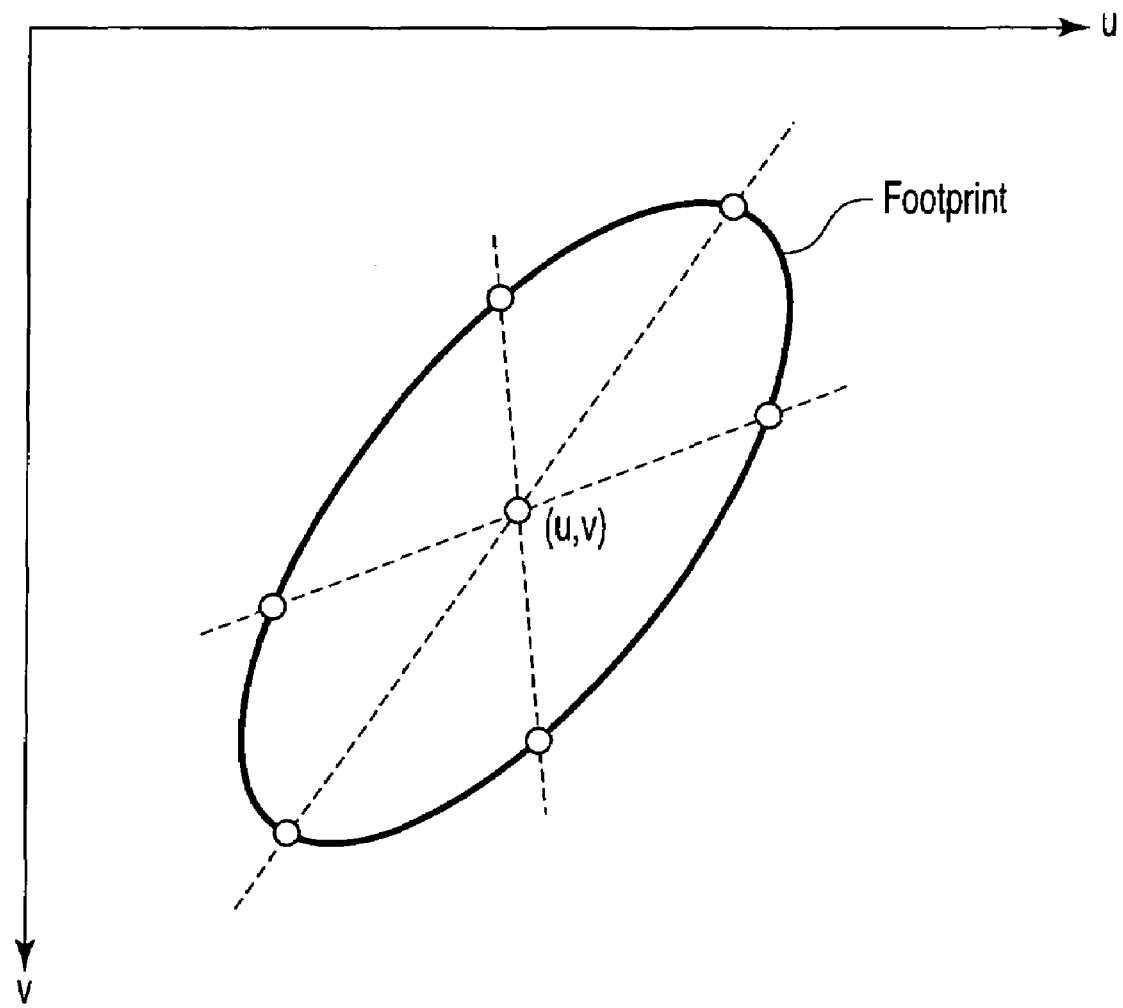
FIG. 27 is a schematic view showing a footprint on a texture in an image process method according to a modification of the first to fourth embodiments of the invention.

Further, in the above-described embodiments, the l-axis and r-axis, which are at 45° and 135° to the x-axis, are considered as shown in FIG. 11. However, the angles of axes which are to be added to the x-axis and y-axis are not limited to 45° and 135° to the x-axis, and may freely be set. Besides, the number of axes to be added to the x-axis and y-axis is not limited to two. For instance, one axis or three or more axes may be added. Axes to be added are not necessarily set in addition to the x-axis and y-axis. For example, when three axes are considered, it is possible to use the x-axis and two axes that are at 120° and 240° to the x-axis. As the number of axes increases, the amount of calculation increases accordingly. The number of axes may be set in consideration of trade-off with the required image quality. For instance, FIG. 27 shows a case in which only one axis (z-axis) is added. Even if the number of axes is three, the calculation of anisotropy can be performed by comparing the longest axis and the shortest axis of the three. In FIG. 27, the footprint has an elliptical shape. In the above-described embodiments, the footprint is assumed to be rectangular for the convenience of description. However, the footprint may be elliptical, as shown in FIG. 27, and the shape of the footprint is not limited.

Figure 28:
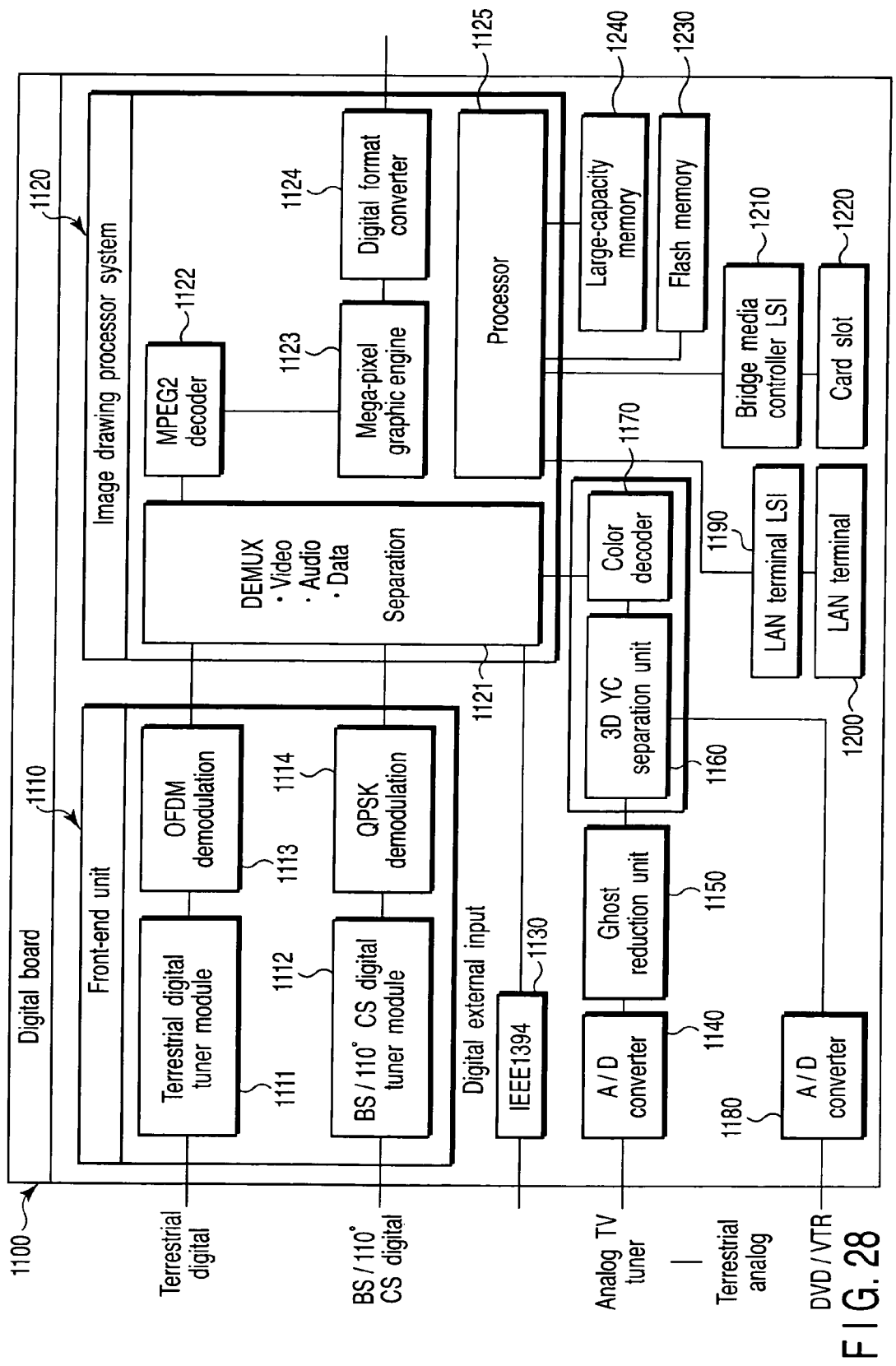
FIG. 28 is a block diagram of a digital TV including the image processing apparatus according to the first to fourth embodiments.

The image processing apparatus according to the first to fourth embodiments are applicable to, e.g. game machines, home servers, TVs, mobile information terminals, etc. FIG. 28 is a block diagram of a digital board that is provided in a digital TV including the image processing apparatus according to the first to fourth embodiments. The digital board is employed to control communication information such as video/audio. As is shown in FIG. 28, the digital board 1100 comprises a front-end unit 1110, an image drawing processor system 1120, a digital input unit 1130, A/D converters 1140 and 1180, a ghost reduction unit 1150, a 3D YC separation unit 1160, a color decoder 1170, a LAN process LSI 1190, a LAN terminal 1200, a bridge media controller LSI 1210, a card slot 1220, a flash memory 1230, and a large-capacity memory (e.g. dynamic random access memory (DRAM)) 1240. The front-end unit 1110 includes digital tuner modules 1111 and 1112, an OFDM (Orthogonal Frequency Division Multiplex) demodulation unit 1113, and a QPSK (Quadrature Phase Shift Keying) demodulation unit 1114.

The image drawing processor system 1120 comprises a transmission/reception circuit 1121, an MPEG2 decoder 1122, a graphic engine 1123, a digital format converter 1124, and a processor 1125. For example, the graphic engine 1123 and processor 1125 correspond to the graphic processor 50 and host processor 20, which have been described in connection with the first to fourth embodiments.

In the above structure, terrestrial digital broadcasting waves, BS (Broadcast Satellite) digital broadcasting waves and 110-degree CS (Communications Satellite) digital broadcasting waves are demodulated by the front-end unit 1110. In addition, terrestrial analog broadcasting waves and DVD/VTR signals are decoded by the 3D YC separation unit 1160 and color decoder 1170. The demodulated/decoded signals are input to the image drawing processor system 1120 and are separated into video, audio and data by the transmission/reception circuit 1121. As regards the video, video information is input to the graphic engine 1123 via the MPEG2 decoder 1122. The graphic engine 1123 then renders an object by the method as described in the embodiments.

Figure 29:
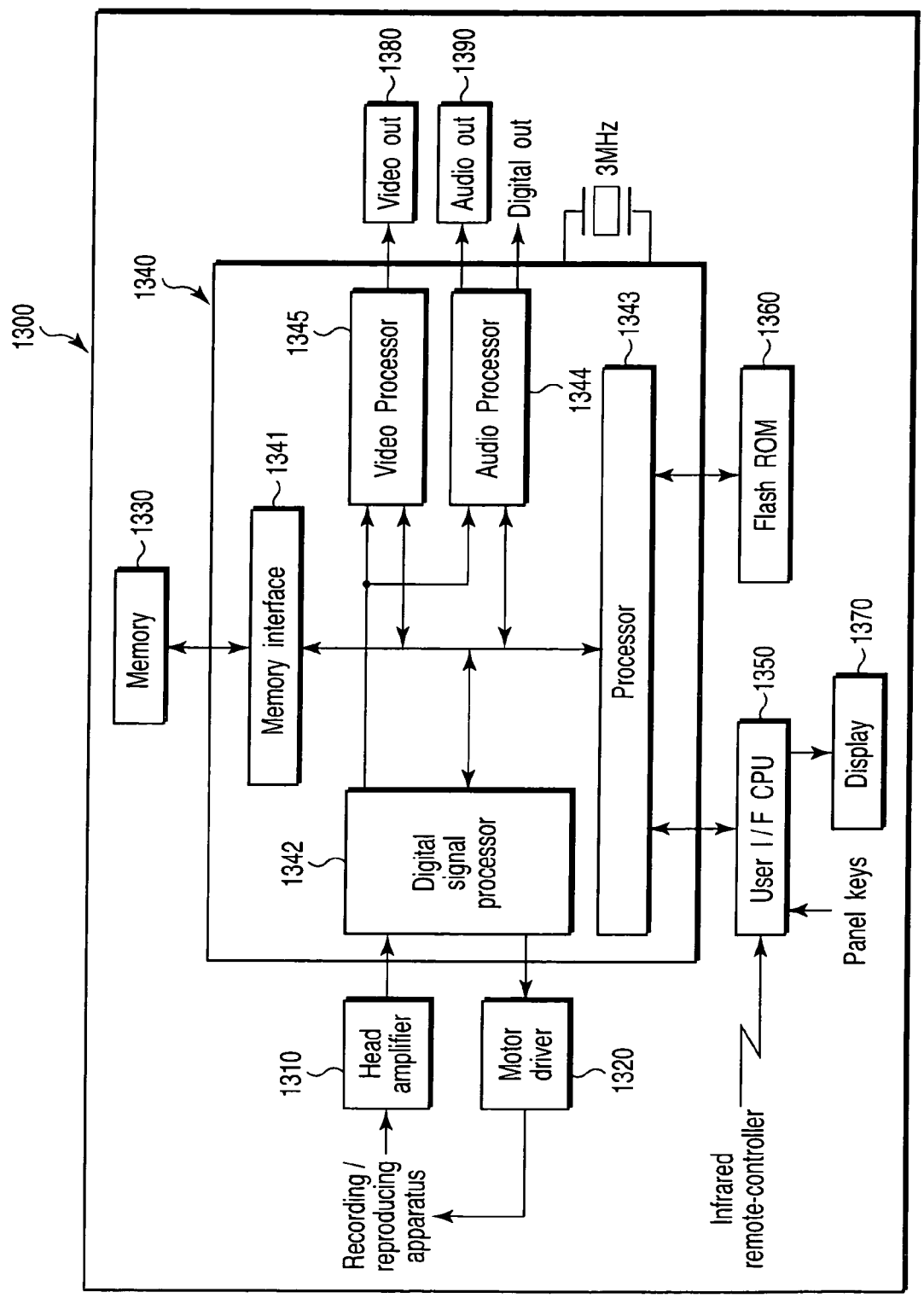
FIG. 29 is a block diagram of a recording/reproducing apparatus including the image processing apparatus according to the first to fourth embodiments.

FIG. 29 is a block diagram of a recording/reproducing apparatus that includes the image processing apparatus according to the first to fourth embodiments. As is shown in FIG. 29, a recording/reproducing apparatus 1300 comprises a head amplifier 1310, a motor driver 1320, a memory 1330, an image information control circuit 1340, a user I/F CPU 1350, a flash memory 1360, a display 1370, a video output unit 1380, and an audio output unit 1390.

The image information control circuit 1340 includes a memory interface 1341, a digital signal processor 1342, a processor 1343, a video processor 1345 and an audio processor 1344. For example, the video processor 1345 and digital signal processor 1342 correspond to the graphic processor 50 and host processor 20, which have been described in connection with the first to fourth embodiments.

With the above structure, video data that is read out of the head amplifier 1310 is input to the image information control circuit 1340. Then, graphic information is input from the digital signal processor 1342 to the video processor 1345. The video processor 1345 draws an object by the method as described in the embodiments of the invention.

In the case of the above-described digital TV or recording/reproducing apparatus, particularly one that has a 3D graphics function, the above-described advantageous effects can be obtained.

The anisotropic texture mapping described in the first to fourth embodiments can be implemented by software using a computer. That is, a CPU may be caused to execute the process illustrated in FIG. 10. In this case, a program that executes the process illustrated in FIG. 10 may be stored in a recording medium. Thereby, the program can freely be carried, and the graphic rendering method according to the embodiments can be implemented in various hardware.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image rendering method comprising:
   generating pixels in accordance with graphic information;
   determining a direction of anisotropy of a footprint obtained by projecting the pixel on a texture on which a set of texels are disposed on uv-coordinates, the direction of anisotropy being determined by comparing lengths in at least three different directions of the footprint on the texture; and
   executing sampling of a MIP map in accordance with the direction of anisotropy, and executing texture mapping for the pixel.

2. The method according to claim 1, wherein when the anisotropy is determined, lengths of the footprint corresponding to an x-axis direction and a y-axis direction, respectively, and lengths of the footprint corresponding to an l-axis direction and an r-axis direction, respectively are compared, the x-axis direction, y-axis direction, l-axis direction and r-axis direction pertaining to a frame buffer on which a set of the pixels exist on xy-coordinates, and the l-axis being at 45° to the x-axis, and the r-axis being at 135° to the x-axis.

3. The method according to claim 1, wherein the determining of a direction of anisotropy includes:
   executing partial differentiation of a texture coordinates u and v on the footprint with respect to an x-axis, a y-axis, an l-axis and an r-axis, thereby finding du/dx, du/dy, du/dr, du/dl, dv/dx, dv/dy, dv/dr, and dv/dl, the x-axis, y-axis, l-axis and r-axis pertaining to a frame buffer on which a set of pixels exist on xy-coordinates, the x-axis, y-axis, l-axis and r-axis extending in different directions on a frame buffer;
   calculating a value Pmax which corresponds to a length of a longer side of the footprint by using du/dx, dv/dx, du/dy and dv/dy, and calculating a value Qmax which corresponds to a length of a longer diagonal of the footprint by using du/dl, dv/dl, du/dr and dv/dr; and
   determining that a direction along the longer side is the direction of anisotropy if Pmax is greater than Qmax, and determining that a direction along the longer diagonal is the direction of anisotropy if Qmax is greater than Pmax.

4. The method according to claim 3, wherein the partial differentiation is executed using differences of the texture coordinates between the neighboring pixels.

5. The method according to claim 3, wherein the determining of a direction of anisotropy further includes:
   calculating a first level-of-detail relating to a case in which the sampling of a MIP map is executed along the longer side of the footprint, and a second level-of-detail relating to a case in which the sampling of a MIP map is executed along the longer diagonal of the footprint; and
   determining, in a texture mapping, a MIP map level using the first level-of-detail if the direction along the longer side is determined to be the direction of anisotropy, and determining a MIP map level using the second level-of-detail if the direction along the longer diagonal is determined to be the direction of anisotropy.

6. The method according to claim 5, wherein the calculating of the first level-of-detail includes calculating a value Pmin which corresponds to a length of a shorter side of the footprint by using du/dx, dv/dx, du/dy and dv/dy; and calculating a first sampling number using a ratio between the Pmax and the Pmin, the calculating of the second level-of-detail includes calculating a value Qmin which corresponds to a length of the shorter diagonal of the footprint by using du/dl, dv/dl, du/dr and dv/dr; and calculating a second sampling number using a ratio between the Qmax and the Qmin, and the sampling of the MIP map is executed by as many times as the first sampling number if the direction along the longer side is determined to be the direction of anisotropy, and is executed by as many times as the second sampling number if the direction along the longer diagonal is determined to be the direction of anisotropy.

7. The method according to claim 6, wherein the ratio between the Pmax and Pmin and the ratio between the Qmax and Qmin are expressed by a power of 2.

8. The method according to claim 1, wherein the pixel footprint has a rectangular shape.

9. An image rendering method comprising:

generating pixels in accordance with graphic information;

determining a direction of anisotropy of a footprint obtained by projecting the pixel on a texture on which a set of texels are disposed on uv-coordinates, the direction of anisotropy being determined by rate of changes of lengths of the footprint relative to length on a frame buffer on which a set of the pixels are disposed on two-dimensional coordinates, the rate of changes being compared with respect to lengths of the footprint in at least three different directions on the frame buffer; and executing sampling of a MIP map in accordance with the direction of anisotropy, and executing texture mapping for the pixel.

10. The method according to claim 9, wherein the rate of changes are compared with respect to an x-axis direction and a y-axis direction, and with an l-axis direction and an r-axis direction of the frame buffer, the l-axis being at 45° to the x-axis, and the r-axis being at 135° to the x-axis.

11. The method according to claim 9, wherein the determining of a direction of anisotropy includes:

executing partial differentiation of a texture coordinates u and v on the footprint with respect to the x-axis, the y-axis, the l-axis and the r-axis, thereby finding du/dx, du/dy, du/dr, du/dl, dv/dx, dv/dy, dv/dr, and dv/dl, the x-axis, the y-axis, the l-axis and the r-axis extending in different directions on the frame buffer;

calculating a value Pmax which corresponds to a length of a longer side of the footprint by using du/dx, dv/dx, du/dy and dv/dy, and calculating a value Qmax which corresponds to a length of a longer diagonal of the footprint by using du/dl, dv/dl, du/dr and dv/dr; and determining that a direction along the longer side is the direction of anisotropy if Pmax is greater than Qmax, and determining that a direction along the longer diagonal is the direction of anisotropy if Qmax is greater than Pmax.

12. An image processing apparatus comprising:

a rasterizer which generates pixels corresponding to a graphic to be rendered, which are included in a plurality of pixels obtained by dividing a graphic drawing region in a matrix;

a plurality of pixel processing sections which execute rendering processes for the pixels generated by the rasterizer, thereby forming a frame buffer on which a set of the pixels are disposed on xy-coordinates;

a texture unit which executes a process for adding a texture, on which a set of texels are disposed on uv-coordinates, to the pixel; and a plurality of memories which store data of the pixels rendered by the pixel processing sections and the texture unit, the texture unit including:

a differentiation circuit which calculates differential coefficients of the texture coordinates with respect to at least three directions on the frame buffer;

a differential vector calculation circuit which calculates differential vectors in the at least three directions of the texture coordinates on the basis of the calculation result of the differentiation circuit; and a selection circuit which selects, based on the result of the differential vector calculation circuit, one of the at least three directions in which the magnitude of the differential vector is the greatest as an axis of anisotropy of the pixel shape on the texture coordinates.

13. The apparatus according to claim 12, wherein the differential vector calculation circuit calculates squares of the differential coefficients, and calculates squares of the magnitude of the differential vectors using the squares of the differentiation values, and the selection circuit compares the squares of the magnitude of the differential vectors.

* * * * *